US012589041B2

(12) United States Patent
Zerhusen et al.

(10) Patent No.: US 12,589,041 B2
(45) Date of Patent: Mar. 31, 2026

(54) PERSON SUPPORT SURFACES INCLUDING SET BY PREVIEW FUNCTION FOR CONTINUOUS LATERAL ROTATION THERAPY

(71) Applicant: Hill-Rom Services, Inc., Batesville, IN (US)

(72) Inventors: Robert Mark Zerhusen, Cincinnati, OH (US); Isaac Stamper, Cincinnati, OH (US)

(73) Assignee: Hill-Rom Services, Inc., Batesville, IN (US)

( * ) Notice: Subject to any disclaimer, the term of this patent is extended or adjusted under 35 U.S.C. 154(b) by 776 days.

(21) Appl. No.: 17/947,632

(22) Filed: Sep. 19, 2022

(65) Prior Publication Data

US 2023/0122043 A1 Apr. 20, 2023

Related U.S. Application Data

(60) Provisional application No. 63/255,500, filed on Oct. 14, 2021.

(51) Int. Cl.
*A61G 7/018* (2006.01)
*A61G 7/10* (2006.01)
(Continued)

(52) U.S. Cl.
CPC ........... *A61G 7/018* (2013.01); *A61G 7/1021* (2013.01); *A61H 9/0078* (2013.01); *A61H 23/006* (2013.01); *A61H 2201/0142* (2013.01)

(58) Field of Classification Search
CPC .. A61G 7/018; A61G 7/1021; A61G 2203/42; A61G 7/001; A61G 7/015;
(Continued)

(56) References Cited

U.S. PATENT DOCUMENTS 8,413,271 B2 4/2013 Blanchard et al.
8,789,222 B2 7/2014 Blanchard et al.
(Continued)

FOREIGN PATENT DOCUMENTS

EP 2 601 925 A2 6/2013
EP 3 090 718 A1 11/2016
(Continued)

OTHER PUBLICATIONS

International Search Report and Written Opinion for Application No. PCT/US2022/076199, mailed Dec. 22, 2022, 14 pages.

*Primary Examiner* — Justin C Mikowski
*Assistant Examiner* — Deborah Talitha Gedeon
(74) *Attorney, Agent, or Firm* — Dinsmore & Shohl LLP

(57) ABSTRACT

A person support apparatus including a person support surface including an actuating device and a controller configured to operate the actuating device to perform a set by preview subroutine and a rotation preview subroutine, wherein, during the set by preview subroutine, the controller receives user input positioning the actuating device into a first preview position and sets the first preview position as a first evaluation position, and wherein, during the set by preview subroutine, the controller receives user input positioning the actuating device into a second preview position and sets the second preview position as a second evaluation position. In embodiments, the controller is configured to simultaneously perform a P&V subroutine during rotation of the person support surface.

24 Claims, 23 Drawing Sheets

(51) Int. Cl.
*A61H 9/00* (2006.01)
*A61H 23/00* (2006.01)

(58) Field of Classification Search
CPC ........ A61G 7/0524; A61G 7/008; A61G 7/00; A61G 7/0015; A61G 7/005; A61G 7/012; A61G 7/057; A61G 7/05707; A61G 7/05746; A61G 7/05753; A61G 7/05761; A61G 7/05769; A61G 7/05776; A61G 7/05784; A61G 7/05792; A61H 9/0078; A61H 23/006; A61H 2201/0142
USPC ..................................... 5/600, 615, 713, 715
See application file for complete search history.

(56) References Cited

U.S. PATENT DOCUMENTS

| | | | | |
|---|---|---|---|---|
| 9,126,571 | B2 | 9/2015 | Emire et al. | |
| 10,052,249 | B2 | 8/2018 | Elliott et al. | |
| 2006/0101581 | A1 * | 5/2006 | Blanchard | A61G 7/00 5/713 |
| 2006/0117482 | A1 * | 6/2006 | Branson | A61G 7/05769 5/600 |
| 2015/0335507 | A1 * | 11/2015 | Emmons | A61G 7/018 5/691 |

FOREIGN PATENT DOCUMENTS

| | | | |
|---|---|---|---|
| EP | 3 922 229 | A1 | 12/2021 |
| WO | 2013/192411 | A2 | 12/2013 |

* cited by examiner

PERSON SUPPORT SURFACES INCLUDING SET BY PREVIEW FUNCTION FOR CONTINUOUS LATERAL ROTATION THERAPY

CROSS-REFERENCE TO RELATED APPLICATION

This application claims the benefit of U.S. Provisional Patent Application No. 63/255,500, filed Oct. 14, 2021 for "Person Support Surfaces Including Set By Preview Function For Continuous Lateral Rotation Therapy," which is hereby incorporated by reference in its entirety including the drawings.

TECHNICAL FIELD

The present disclosure relates to a system and method for controlling person support surfaces and, more particularly, the present disclosure relates to a system and method for setting preview parameters for rotational therapy on a person support surface.

BACKGROUND

Currently, caregivers face significant challenges taking care of patients on person support surfaces of a person support apparatus with therapy needs. Oftentimes, therapy includes lateral rotation of the person support surface for patients needing pulmonary therapy or decubitus prevention or treatment. The person support surface is typically laterally rotated by an air support system having a plurality of air bladders including a right rotation bladder and a left rotation bladder. A pneumatic control system includes an air handling unit that is mounted to a base of the person support surface and a control device mounted, for example, to an end rail or side rail of the person support surface. The rotation bladders are inflated and deflated to rotate the person support surface to a left or right angle.

Generally, the patient on the person support surface is coupled to several lines, for example, an IV or an air tube of a respirator device. As the air bladders of the person support surface are actuated to rotate the patient, the patient's lines may become pinched or caught in various moveable components of the person support surface or by appendages of the patient themselves. For example, the line may be caught under the leg or arm of the patient. In another example, the line may be caught between the patient and the side rail. Such events may result in the fluids in the lines becoming occluded or the lines becoming entirely disconnected.

Accordingly, a need exists for improved patient support surfaces that rotate the patient to various evaluation positions for a predetermined period of time so that a caregiver can assess whether any lines are occluded or disconnected prior to performing the rotation therapy.

SUMMARY

In one embodiment, a person support apparatus includes: a person support surface including an actuating device; and a controller operable to control the actuating device, the controller comprising a processor and a non-transitory memory device, the memory device including instructions that, when executed by the processor, cause the processor to operate the actuating device to perform a set by preview subroutine and a rotation preview subroutine, wherein, during the set by preview subroutine, the controller receives user input positioning the actuating device into a first preview position and sets the first preview position as a first evaluation position, wherein, during the set by preview subroutine, the controller receives user input positioning the actuating device into a second preview position and sets the second preview position as a second evaluation position, wherein, during the rotation preview subroutine, the controller causes the actuating device to move the person support surface to the first evaluation position for a first predetermined period of time, wherein the controller causes the actuating device to move the person support surface to a flat position for a second predetermined period of time after the first predetermined period of time, and wherein the controller causes the actuating device to move the person support surface to the second evaluation position for a third predetermined period of time after the second predetermined period of time.

In another embodiment, a person support apparatus includes: a person support surface including an actuating device; and a controller operable to control the actuating device, the controller comprising a processor and a non-transitory memory device, the memory device including instructions that, when executed by the processor, cause the processor to operate the actuating device to simultaneously perform a rotation subroutine and a percussion and vibration (P&V) subroutine, wherein, during the rotation subroutine, the controller causes the actuating device to move the person support surface to a first rotation position for a first predetermined period of time, wherein the actuating device causes the actuating device to move the person support surface to a flat position for a second predetermined period of time after the first predetermined period of time, wherein the actuating device causes the actuating device to move the person support surface to a second rotation position for a third predetermined period of time after the second predetermined period of time, and wherein, during the rotation subroutine, the controller causes the actuating device to perform P&V therapy.

In yet another embodiment, a method includes: receiving user input including instructions to position a actuating device of a person support surface into a first preview position and setting the first preview position as a first evaluation position; receiving user input including instructions to position the actuating device into a second preview position and setting the second preview position as a second evaluation position; operating the actuating device to move the person support surface to the first evaluation position for a first predetermined period of time; operating the actuating device to move the person support surface to a flat position for a second predetermined period of time after the first predetermined period of time; and operating the actuating device to move the person support surface to the second evaluation position for a third predetermined period of time after the second predetermined period of time.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
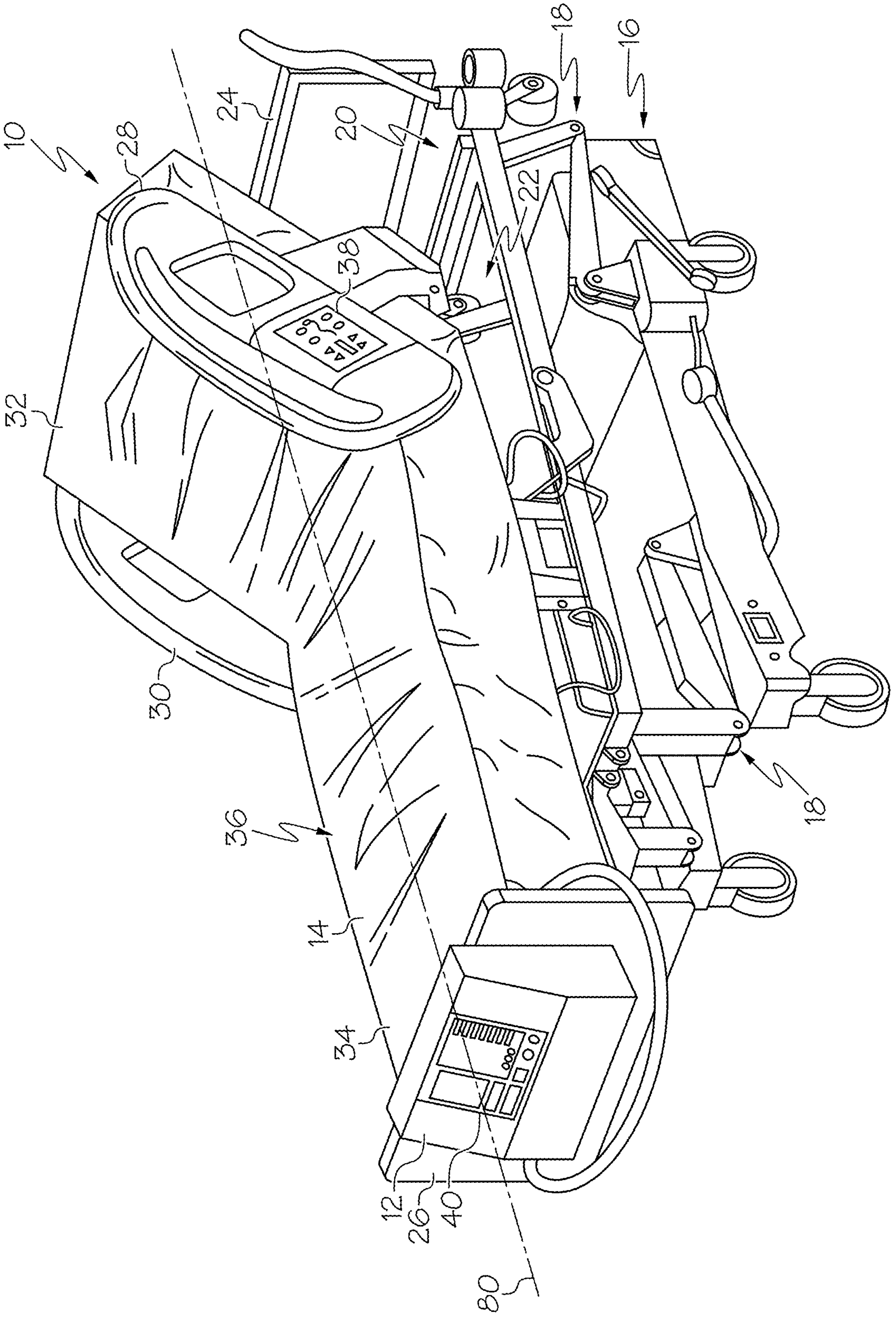
FIG. 1 schematically depicts a perspective view of a person support apparatus including a touch screen control system for lateral rotation of a person support surface, according to one or more embodiments shown and described herein.

Embodiments described herein are directed to person support apparatus and methods for performing a set by preview subroutine and a rotation preview subroutine such that a degree of actuation of an actuating device may be set by positioning the actuating device during the set by preview subroutine and storing the values of the position of the actuating device to be utilized during the rotation preview subroutine.

Various embodiments of the person support apparatus and methods for operation of the person support apparatus are described in more detail herein. Whenever possible, the same reference numerals will be used throughout the drawings to refer to the same or like parts.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

FIG. 1 illustrates a person support apparatus 10, illustrated as a bed, having a person support surface 14, illustrated as a mattress. A touch screen control system 12 including a user interface 40 is provided for controlling lateral rotation of the person support surface 14. The person support apparatus 10 includes a base frame 16, an intermediate frame 20 coupled to the base frame 16 by linkages 18, and an articulating deck frame 22 that is coupled to the intermediate frame 20 and that supports the person support surface 14. The person support apparatus 10 also includes a head end 24, a foot end 26, a left side rail 28, and a right side rail 30. A longitudinal axis 80 extends from the head end 24 to the foot end 26. The deck frame 22 includes separate sections that articulate relative to the base frame 16 and relative to each other, for example, a mattress center section 36 that is height adjustable, and a mattress head section 32 and a mattress foot section 34 that are adjustable in elevation relative to the mattress center section 36. A person control panel 38 is used to control articulation of the deck frame 22.

Figure 2:
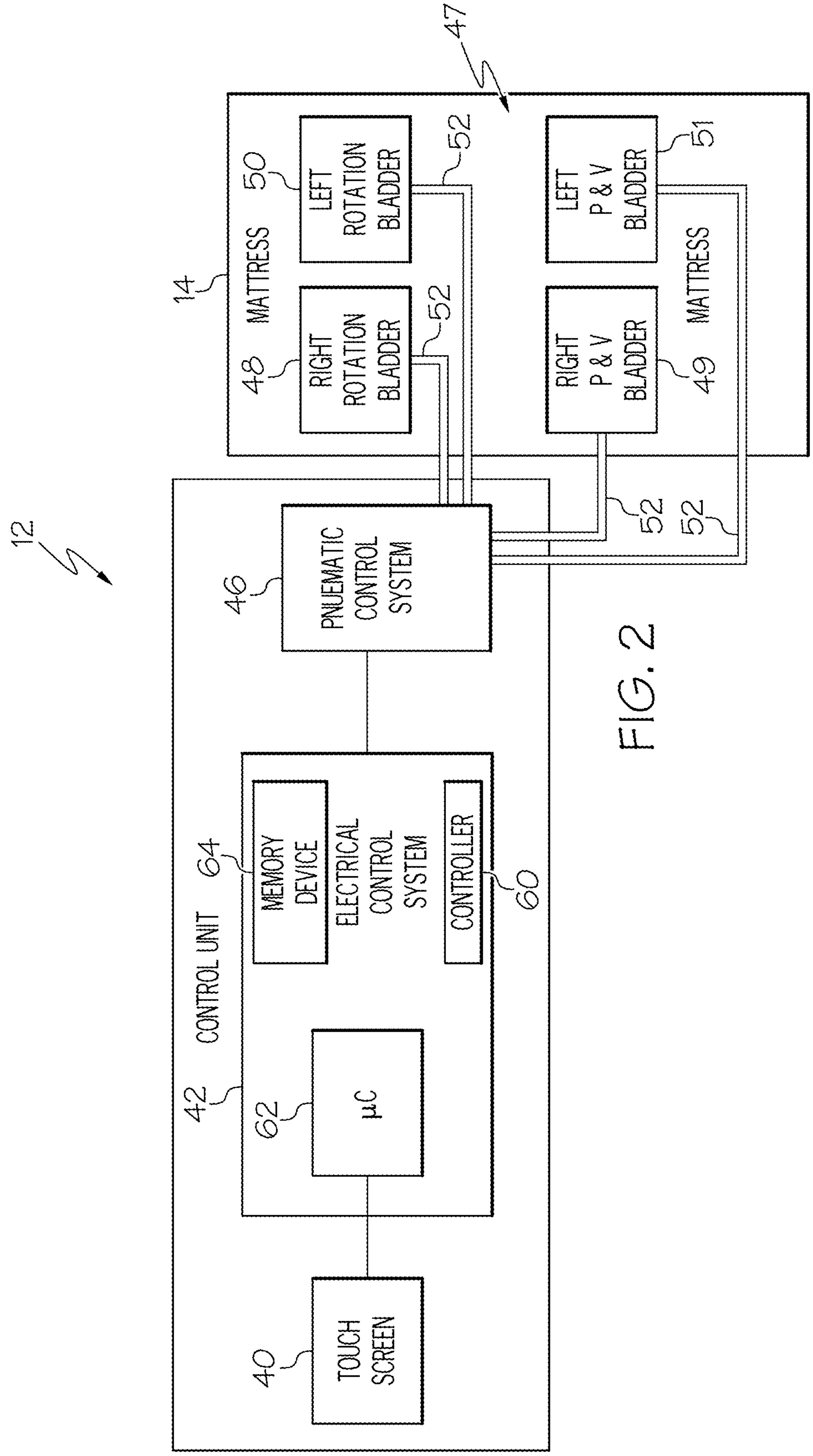
FIG. 2 schematically depicts a block schematic diagram of the touch screen control system, according to one or more embodiments shown and described herein.

FIG. 2 illustrates the control system 12 and its interaction with the person support surface 14. The control system 12 includes the user interface 40, an electrical control system 42, and a pneumatic control system 46. The electrical control system 42 includes a controller 60, a microprocessor 62, and a memory device 64. The electrical control system 42 is electrically coupled to the user interface 40 and the pneumatic control system 46. The memory device 64 includes instructions that, when carried out by the microprocessor 62 cause the controller 60 to control the control system 42 and the pneumatic control system 46.

The person support surface 14 includes an actuating device, for example, a bladder system 47 having a right rotation bladder 48 and a left rotation bladder 50 that provides positioning and/or therapy, for example, rotational therapy, percussion and/or vibration therapy, as discussed in more detail herein, and positioning to assist turning of the person. In embodiments, the bladder system 47 may also include a right P&V (percussion and vibration) bladder 49 and a left P& V bladder 51. As such, the right rotation bladder 48 and a left rotation bladder 50 may be specifically utilized for facilitating rotation of the person support surface 14, while the right P&V bladder 49 and the left P&V bladder 51 simultaneously provide percussion and/or vibration without affecting rotation of the person support surface 14. It should be appreciated that the right P&V bladder 49 and the left P&V bladder 51 may include the same structure as the right rotation bladder 48 and the left rotation bladder 50.

The control system 12 controls the right rotation bladder 48, the left rotation bladder 50, the right P&V bladder 49, and the left P&V bladder 51 by receiving user inputs at the user interface 40. The electrical control system 42 controls and monitors the pneumatic control system 46 based on the user inputs. The user interface 40 provides a graphical interface for setting and monitoring the electrical control system 42 and the pneumatic control system 46, which in turn actuates pneumatic aspects of the right rotation bladder 48, the left rotation bladder 50, the right P&V bladder 49, and the left P&V bladder 51. The pneumatic control system 46 is coupled to the right rotation bladder 48, the left rotation bladder 50, the right P&V bladder 49, and the left P&V bladder 51 by pneumatic lines 52. Additionally, pressure sensors or alternative type sensors such as capacitive, inductive, or optical sensors, may also provide feedback control of the bladders 48, 49, 50, 51 to the pneumatic control system 46 or the electrical control system 42.

Figure 4:
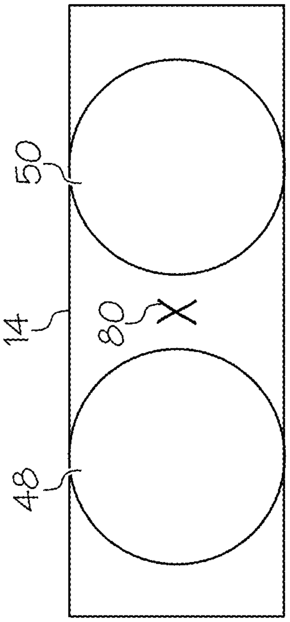
FIG. 4 schematically depicts an end view of the person support surface shown in FIG. 1 illustrating the person support surface in a flat position, according to one or more embodiments shown and described herein.
Figure 3:
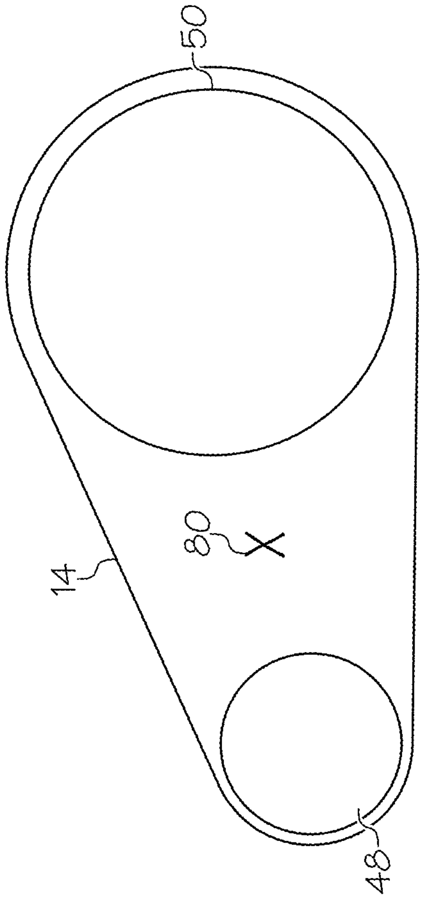
FIG. 3 schematically depicts an end view of the person support surface shown in FIG. 1 illustrating the rotation of the person support surface with a left side lifted, according to one or more embodiments shown and described herein.
Figure 5:
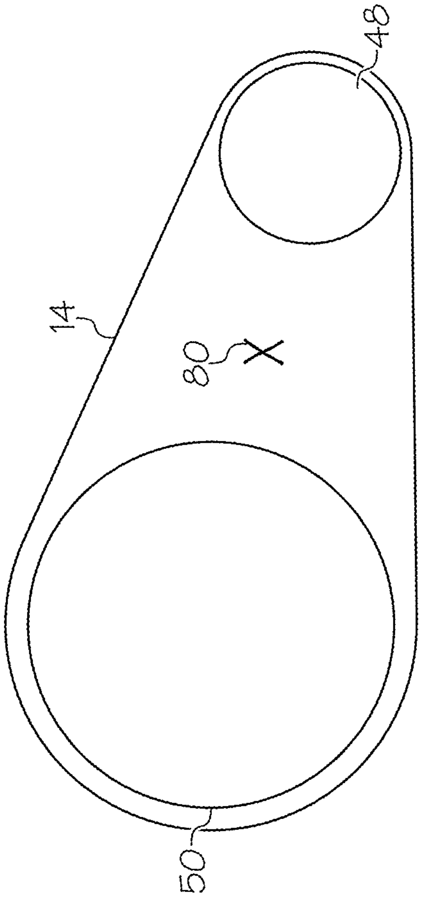
FIG. 5 schematically depicts an end view of the person support surface shown in FIG. 1 illustrating the rotation of the person support surface with a right side lifted, according to one or more embodiments shown and described herein.

The pneumatic control system 46 generally provides pressure or vacuum to, or sealing of, the pneumatic lines 52 to selectively inflate, deflate, or maintain the inflation of the right rotation bladder 48 and the left rotation bladder 50. For example, to rotate a person on the person support surface 14 toward the right relative to a longitudinal axis 80 of the person support surface 14, i.e., into a right rotation position, the pneumatic control system 46 actuates the right rotation bladder 48 located under the person's right side to a volume or capacity that is less than a volume or capacity of the left rotation bladder 50 located under the person's left side, as illustrated in FIG. 3. In another example, to rotate a person on the person support surface 14 toward the left relative to the longitudinal axis 80, i.e., into a left rotation position, the pneumatic control system 46 actuates the left rotation bladder 50 located under the person's left side to a volume or capacity that is less than a volume or capacity of the right rotation bladder 48 located under the person's right side, as illustrated in FIG. 5. To position the person in a flat orientation, as shown in FIG. 4, the left rotation bladder 50 and the right rotation bladder 48 are actuated to substantially the same volume or capacity.

Alternatively, only one of or a portion of the right rotation bladder 48 and the left rotation bladder 50 of the bladder system 47 may be actuated by inflation or deflation to laterally rotate a person on person support surface 14 to different rotational positions. Additionally, the bladder system 47 may comprise bladders that are associated with the person support surface 14 in an arrangement different from that shown in FIGS. 2-5, as is known in the art. For example, the bladder system 47 may include vertically stacked bladders, one of which is normally inflated and another that is inflated or deflated to provide rotation. Additionally, the pneumatic control system 46 may also provide other pneumatic control, for example, to provide percussion, vibration, or other desired person therapy or positioning, as discussed in more detail herein. The pneumatic control system 46 and the bladder system 47 of person support surface 14 may alternatively include a non-pneumatic mechanical or electrometrical control and motion system, or a pneumatic system utilizing movement elements other than bladders.

During rotational therapy, the person is rotated to desired angles of rotation on each of the right side, left side, and flat for a rotation period of time. For example, the person may be rotated to 40 degrees to each side for 10 minutes and flat for 10 minutes. Generally, the right rotation bladder 48 and the left rotation bladder 50 are actuated over a period of dwell or hold time that enables the person to slowly be moved into the desired angle of rotation. It will be appreciated that any rotational angle may be desired for any period of time. The preview function of the disclosed embodiments, enables a caregiver to quickly assess whether any lines will be occluded by rotating the person to the desired angles of rotation without dwell or hold time. That is, the caregiver may assess the person at a plurality of evaluation positions for predetermined periods of time including a right turn position, a left turn position, and a flat position without waiting for dwell or hold time.

In an exemplary embodiment, the person is turned to a right turn position for a right turn predetermined period of time. The right turn predetermined period of time may be any suitable period of time for evaluation, for example, 0 seconds to 30 seconds. During the right turn predetermined period of time, the caregiver assesses the person and the lines. If any lines are occluded, the caregiver may stop the preview and return the person to the flat position before expiration of the right turn predetermined period of time. After an expiration of the right turn predetermined period of time, the person is rotated to the flat position for a flat predetermined period of time. The flat predetermined period of time may be any suitable period of time for evaluation, for example, 0 seconds to 30 seconds. If any lines are occluded, the caregiver may stop the preview before expiration of the flat predetermined period of time. After an expiration of the flat predetermined period of time, the person is rotated to a left turn position for a left turn predetermined period of time. The left turn predetermined period of time may be any suitable period of time for evaluation, for example, 0 seconds to 30 seconds. If any lines are occluded, the caregiver may stop the preview and return the person to the flat position before expiration of the left turn predetermined period of time.

The evaluation positions may have an angle of rotation that is the same as the desired angle of rotation. In some embodiments, the angle of rotation of the evaluation positions may be less than or greater that the desired angle of rotation. For example, the angle of rotation for evaluation may be within a range of 0 degrees to 40 degrees. After the expiration of the last predetermined period of time, the person support surface 14 returns to a flat position. At this time, the caregiver may make any necessary adjustments to the lines and either perform a second preview or initiate the rotational therapy.

FIGS. 6-10 illustrate routines for different aspects of an algorithm executed by the microprocessor 62 associated with the controller 60 based on sets of instructions in the memory device 64. These algorithms enable the caregiver to preview and assess the position of the person at various angles of rotation, as set forth above.

Figure 11:
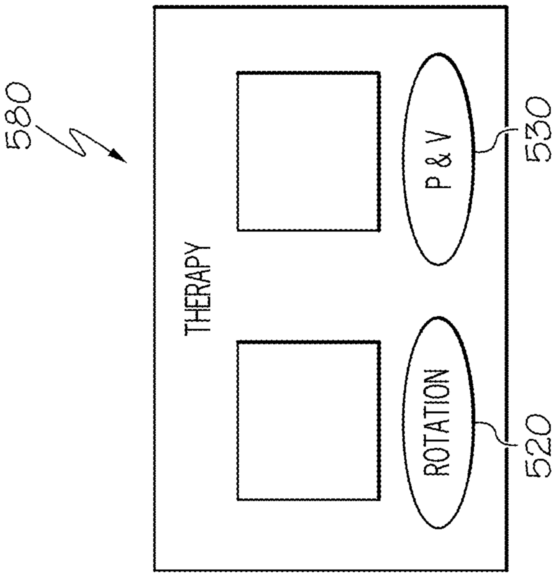
FIG. 11 schematically depicts a view of a "Therapy" screen displayed on the user interface, according to one or more embodiments shown and described herein.
Figure 10:
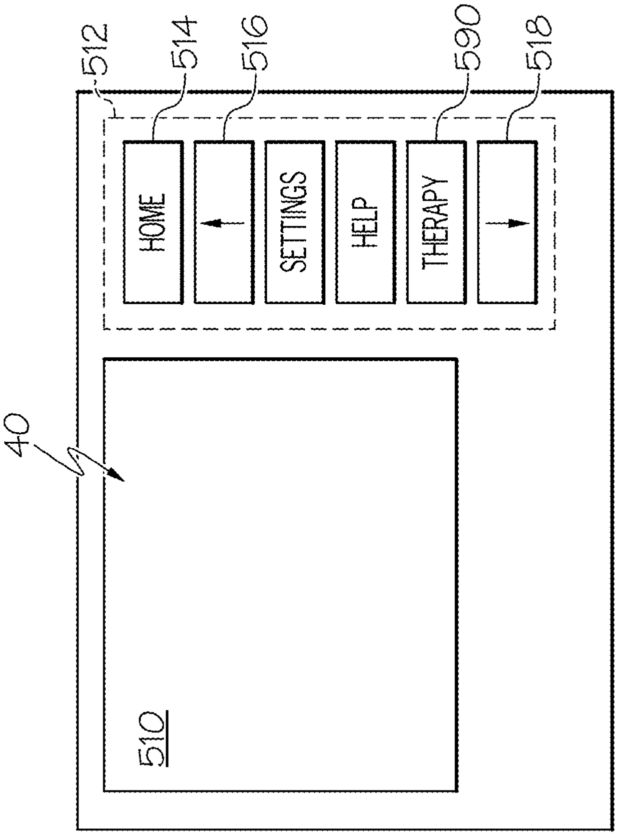
FIG. 10 schematically depicts a view of a user interface for controlling lateral rotation of the person support surface of the person support apparatus, according to one or more embodiments shown and described herein.
Figure 12:
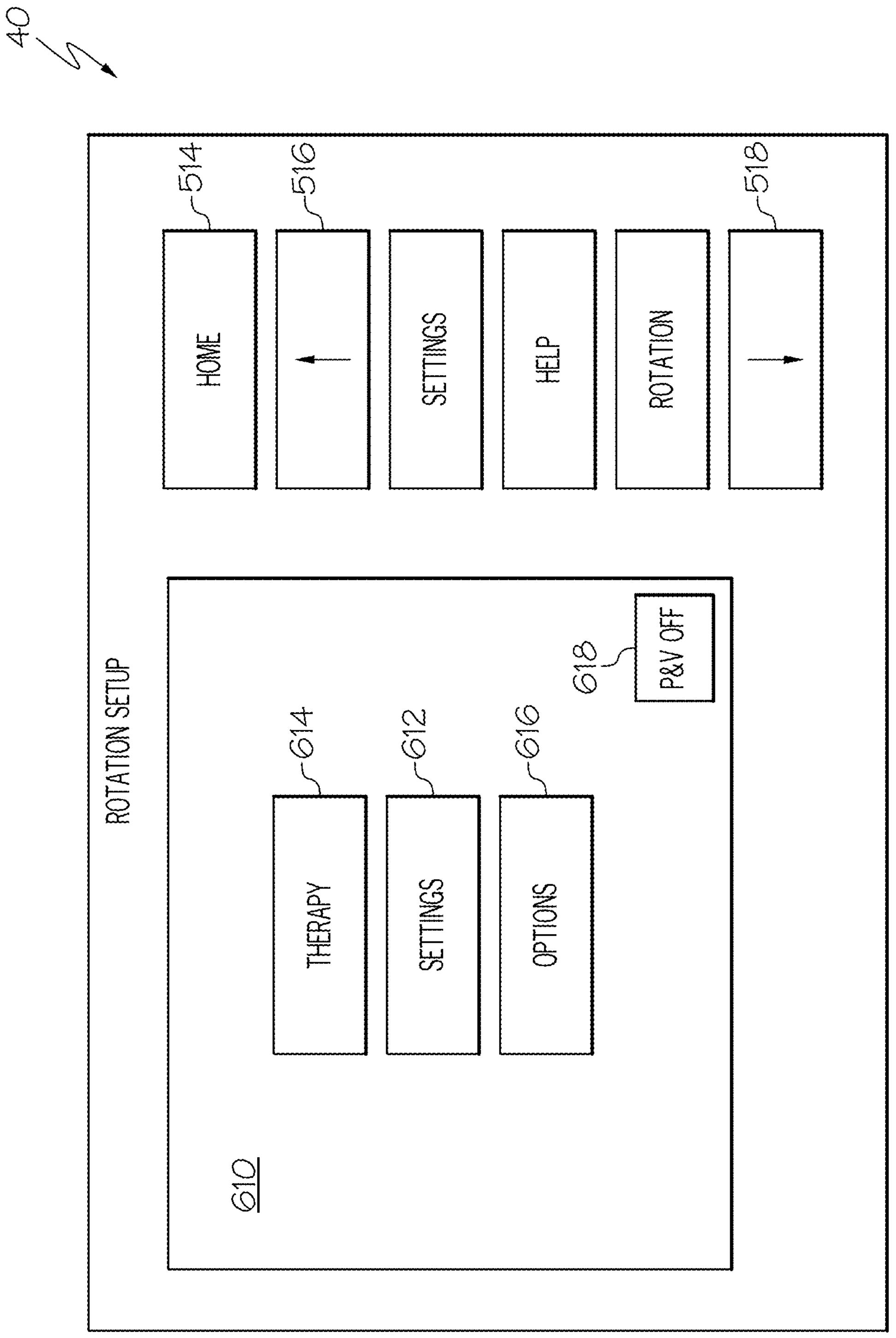
FIG. 12 schematically depicts a view of a "Rotation Setup" screen displayed on the user interface, according to one or more embodiments shown and described herein.

The user interface 40, illustrated in FIG. 10, includes a display screen 510 and input buttons 512, including a "Home" button 514 and up and down arrow buttons 516, 518. A "Therapy" screen 580, as shown in FIG. 11, may be generated by selecting a "Therapy" button 590 of the user interface. A "Rotation Setup" screen 610, shown in FIG. 12, may be generated by pressing a "Rotation" button 520 of the "Therapy" screen 580 shown in FIG. 11. The "Rotation" button 520 is used to enter and preview parameters associated with lateral rotation for persons needing pulmonary therapy. For example the "Rotation" button 520 may be selected to enter the desired angle of rotation for therapy, and/or the rotational time period. Selection of the "Rotation" button 520 results in the "Rotation Setup" screen 610 appearing on the user interface 40, as illustrated in FIG. 12.

Figure 28:
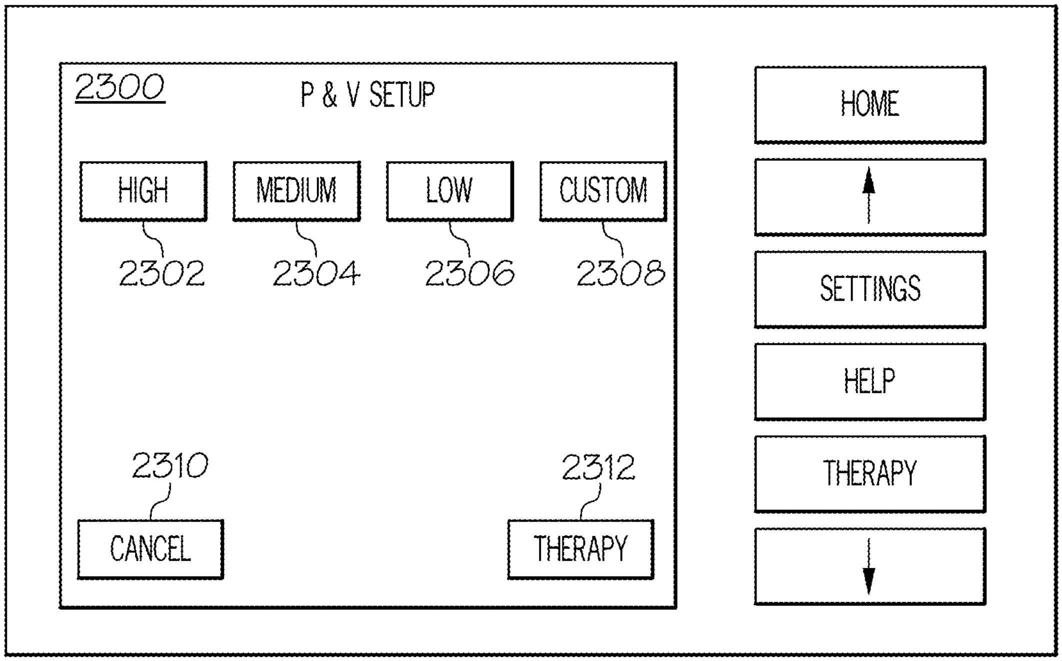
FIG. 28 schematically depicts a view of a "P&V Setup" screen displayed on the user interface, according to one or more embodiments shown and described herein.

Alternatively, as discussed in more detail herein, a "P&V Setup" screen 2300, illustrated in FIG. 28, may be generated by pressing a "P&V" button of the "Therapy" screen 580 shown in FIG. 11. The "P&V" button 530 is used to enter and preview parameters associated with actuation of the bladder system 47, specifically the right P&V bladder 49 and the left P&V bladder 51, to provide percussion and/or vibration for persons needing pulmonary therapy. For example the "P&V" button 530 may be utilized to enter the desired parameters of the percussion and vibration, as well as position, of the right P&V bladder 49 and the left P&V bladder 51.

Figure 6:
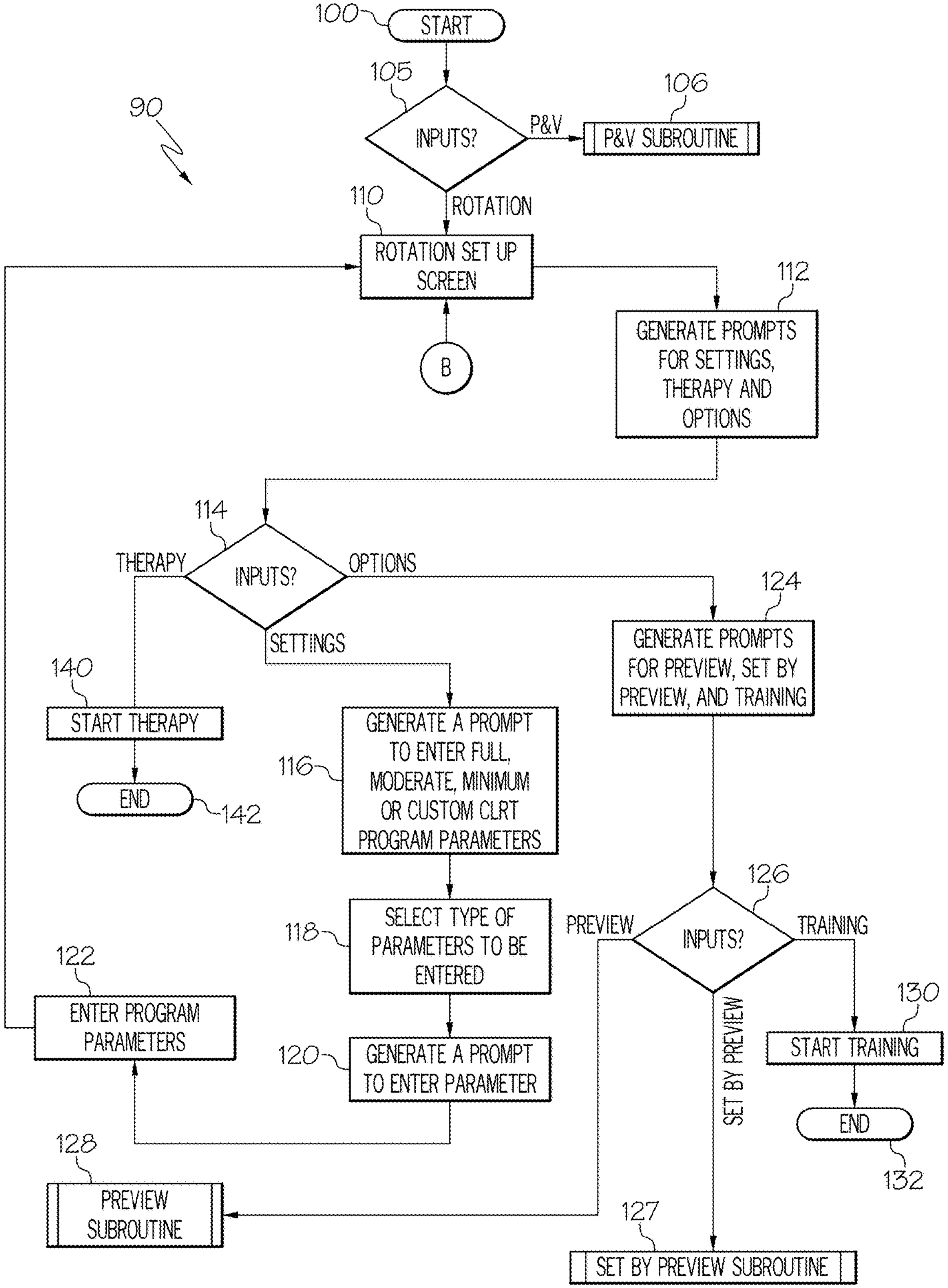
FIG. 6 is a flow chart illustrating an algorithm that executes a rotation routine, according to one or more embodiments shown and described herein.

Referring to FIG. 6, in response to a method starting at process step 100 and the "Rotation Setup" screen 610 being selected by the caregiver at decision step 105, a "Rotation" routine 90 is started. When the "Rotation Setup" screen 610 is selected, three buttons are generated and appear on the user interface 40, at process step 112. The three buttons include a "Settings" button 612, a "Therapy" button 614, and an "Options" button 616, as illustrated in FIG. 12. The caregiver may select one of those buttons by providing an input into the controller 60, which, at decision step 114, determines which button has been selected.

In embodiments, a "P&V" button 618 may be displayed on the "Rotation Setup" screen 610. Selection of the "P&V" button 618 may toggle operation of the right P&V bladder 49 and the left P&V bladder 51 between an OFF state and an ON state. In the OFF state, the right P&V bladder 49 and the left P&V bladder 51 are not actuated to provide any P&V functionality. Alternatively, in the ON state, the right P&V bladder 49 and the left P&V bladder 51 are actuated to provide P&V functionality, as described in more detail herein. In embodiments, selecting the "P&V" button 618 may cause the user interface 40 to display a "P&V Setup" screen 2300, as discussed in more detail herein. By providing the "P&V" button 618 while selecting the rotation settings on the "Rotation Setup" screen 610, P&V functionality may be quickly enabled without navigating back to the "Therapy" screen 580.

Figure 13:
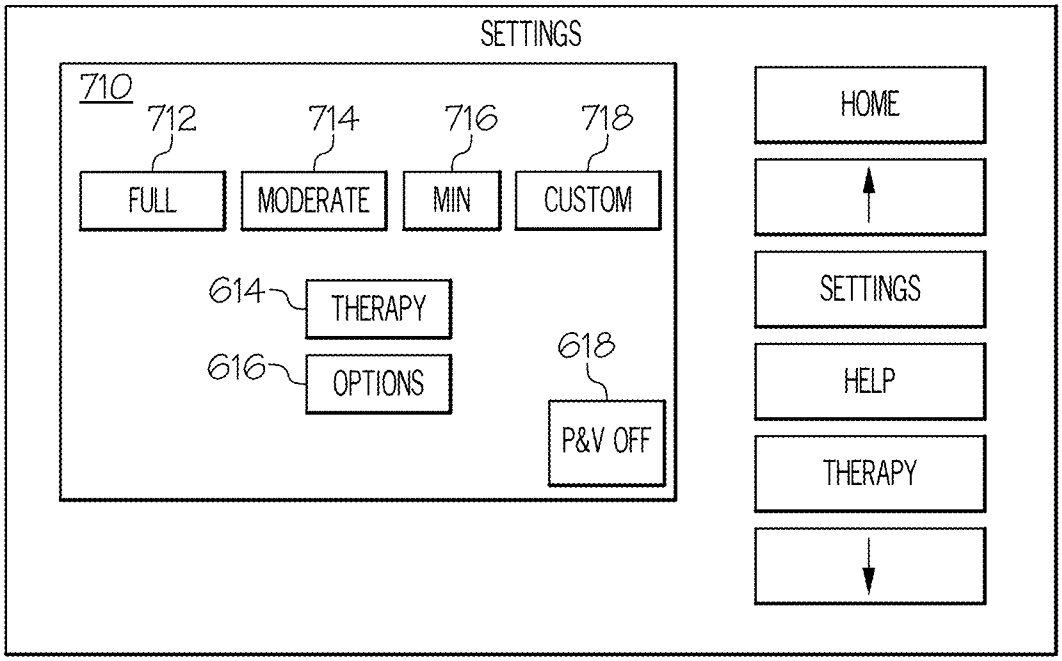
FIG. 13 schematically depicts a view of a "Settings" screen displayed on the user interface, according to one or more embodiments shown and described herein.

Selection of the "Settings" button 612 allows for the caregiver to adjust parameters for the rotation therapy, as set forth above, and results in the generation of parameters buttons for the entry of program parameters at process step 116. The parameter buttons include a "Full" parameter 712, a "Moderate" parameter 714, a "Minimum" parameter 716, and a "Custom" parameter 718, which are shown in the "Settings" screen 710 illustrated in FIG. 13. The controller 60, at decision step 118, determines which parameter 712, 714, 716, 718 has been selected. The "Full" parameter 712 enables the caregiver to select a predetermined full rotation, i.e., 40 degrees on left and right. It should be noted that full rotation may include other angles of rotation, for example, an angle of rotation within a range of 35 degrees to 40 degrees. The "Moderate" parameter 714 enables the caregiver to select an angle of rotation that is less than the full angle of rotation, i.e., 20 degrees. It should be noted that moderate rotation may include other angles of rotation, for example, an angle of rotation within a range of 25 degrees to 35 degrees. The "Minimum" parameter 716 enables the caregiver to select an angle of rotation that is less than the moderate angle of rotation, i.e., 10 degrees. It should be noted that minimum rotation may include other angles of rotation, for example, an angle of rotation within a range of 20 degrees to 25 degrees. If the "Custom" parameter 718 is selected, the controller 60 generates buttons to enter custom parameters on a "Parameters" screen 810, at process step 120. The custom parameters may include an angle of rotation and a rotation time period. The "Parameters" screen 810, illustrated in FIG. 14, enables one of right rotation, center rotation, and left rotation to be entered at process step 122. When the entry of the parameters is completed, selection of a "Done" button 818, returns the caregiver to the "Rotation Setup" screen 610, shown in FIG. 12.

Figure 7:
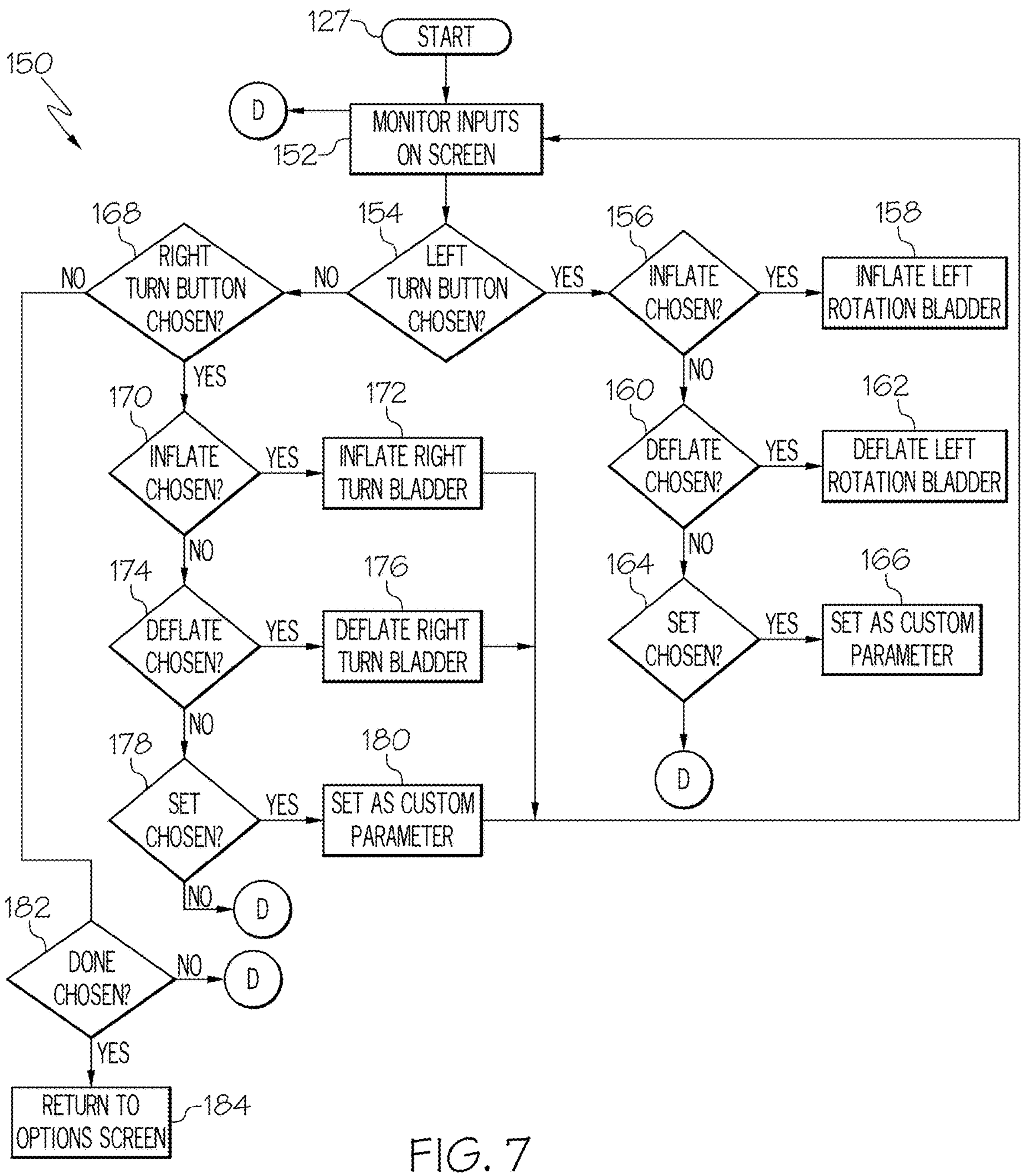
FIG. 7 is a flow chart illustrating an algorithm that executes a set by preview subroutine of the rotation routine, according to one or more embodiments shown and described herein.
Figure 8:
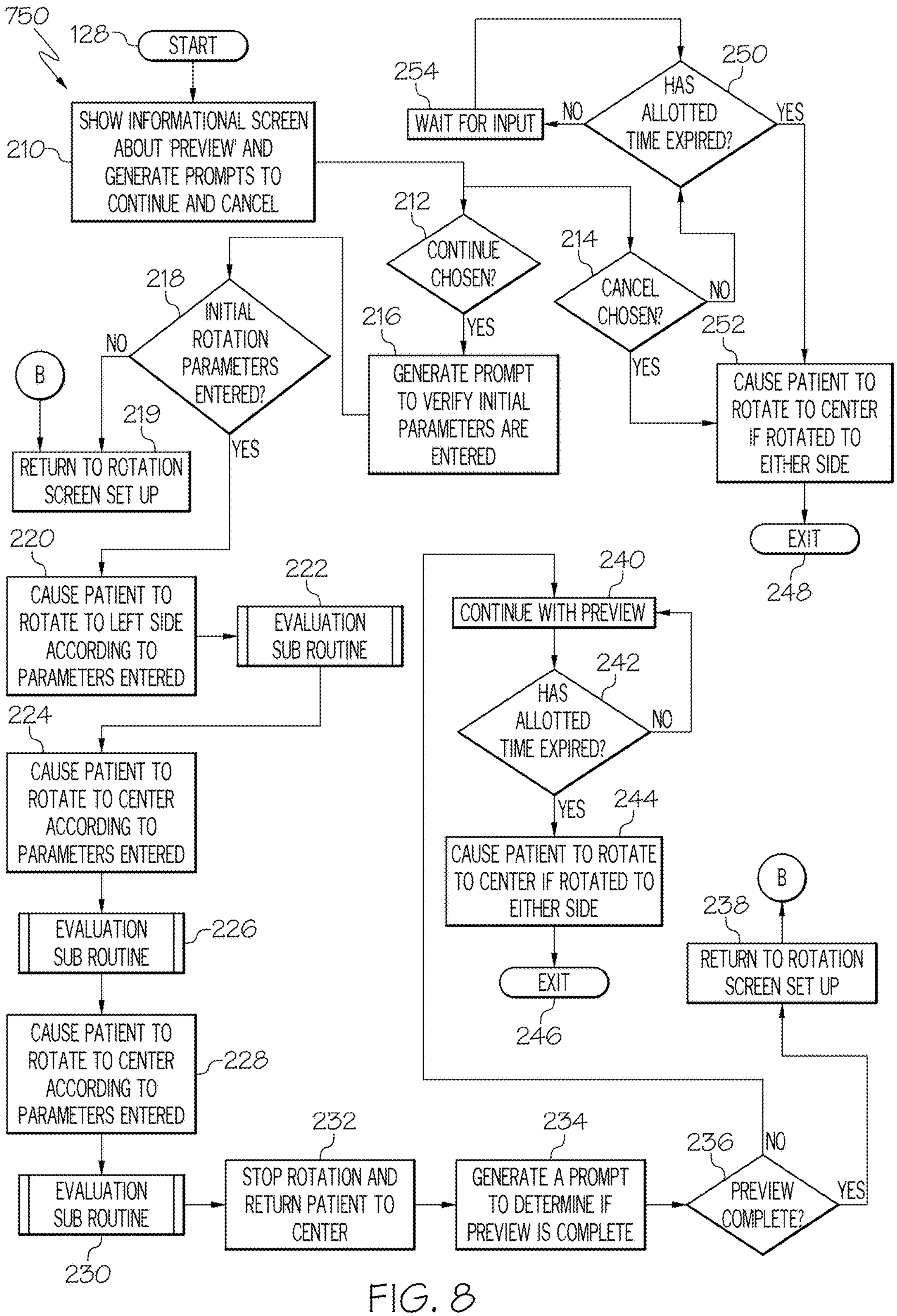
FIG. 8 is a flow chart illustrating an algorithm that executes a preview subroutine of the rotation routine, according to one or more embodiments shown and described herein.
Figure 15:
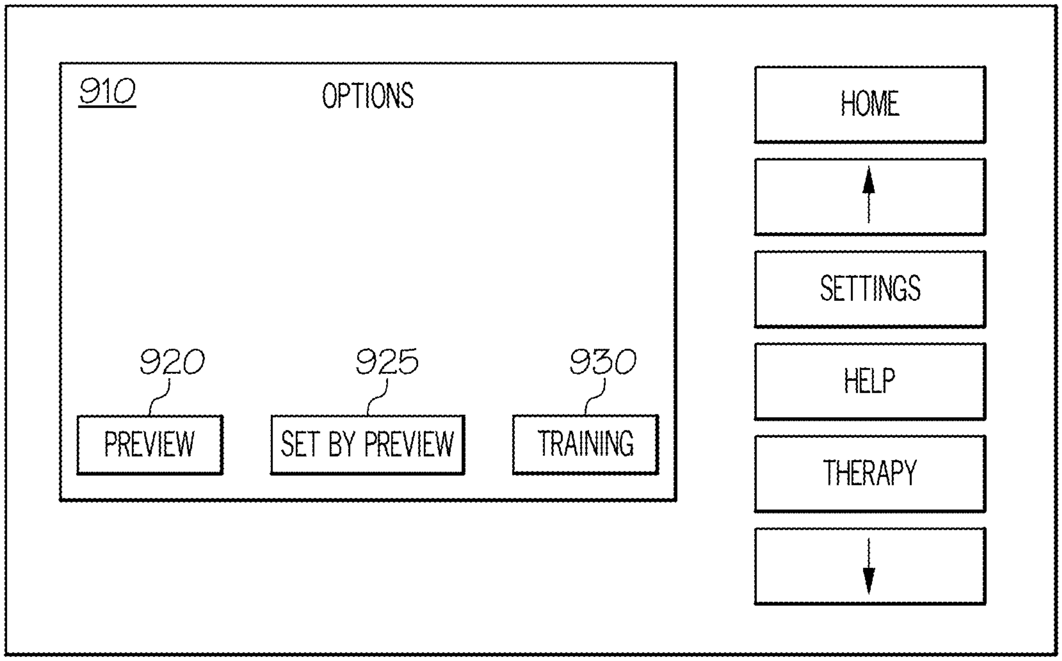
FIG. 15 schematically depicts a view of an "Options" screen displayed on the user interface, according to one or more embodiments shown and described herein.

If the caregiver selects the "Options" button 616 on the "Rotation Setup" screen 610 or the "Settings" screen 710, at decision step 114, the controller 60 generates an "Options" screen 910, as illustrated in FIG. 15, that displays a "Preview" button 920, a "Set By Preview" button 925, and a "Training" button 930, at process step 124. The controller 60, at decision step 126, determines which button has been selected. Selection of the "Set By Preview" button 925 results in the generation, at process step 127, of a "Set By Preview" subroutine 150, as illustrated in FIG. 7. Selection of the "Preview" button 920 results in the generation, at process step 128, of a "Preview" subroutine 750, as illustrated in FIG. 8. Selection of the "Training" button 930 results in the generation the "Training" subroutine, at process step 130. After the "Training" subroutine, the "Rotation" routine 90 ends, at process step 132.

In some embodiments, selecting the "Training" button 930 causes the pneumatic control system 46 to cause the intermittent movement of the right rotation bladder 48 and the left rotation bladder 50 to the desired angle of rotation over a plurality of periods of time. In some embodiments, the right rotation bladder 48 and/or the left rotation bladder 50 is moved to 50% of the desire angle of rotation over a first of the plurality of periods of time. The right rotation bladder 48 and/or the left rotation bladder 50 may then be moved to an additional 10% of the desired angle of rotation over a second of the plurality of periods of time. The second of the plurality of periods of time may occur one hour after the first of the plurality of periods of time. Reference to this intermittent movement of the right rotation bladder 48 and the left rotation bladder 50 over time may be referred to herein as "patient acclimation mode", which may be toggled on or off.

Figure 14:
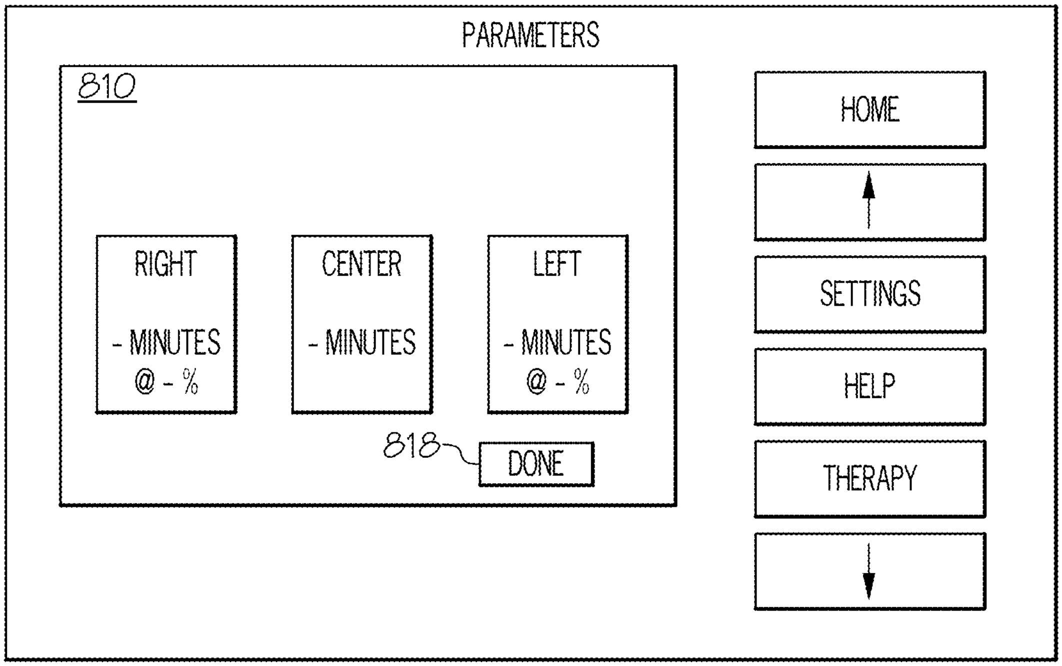
FIG. 14 schematically depicts a view of a "Parameters" screen displayed on the user interface, according to one or more embodiments shown and described herein.

The "Set By Preview" subroutine 150, illustrated in FIG. 7, allows caregivers to set a degree of inflation of the right rotation bladder 48 and the left rotation bladder 50 without manually entering a specific percentage of inflation for the right rotation bladder 48 and the left rotation bladder 50, as discussed in the "Parameters" screen 810 illustrated in FIG. 14. Rather, each of the right rotation bladder 48 and the left rotation bladder 50 may be incrementally inflated or deflated to a specific volume and once the desired position of the person support surface 14 is reached, the inflation percentages of the right rotation bladder 48 and the left rotation bladder 50 may be automatically entered in the "Parameters" screen 810. Accordingly, it may not necessary to input the particular inflation percentages for each of the right rotation bladder 48 and the left rotation bladder 50 as discussed herein when setting the parameters. In addition, it should be appreciated that this particular method of setting inflation percentages may be desirable as inflation percentages for one person may result in different degrees of rotation for another person operating at the same inflation percentages. As such, it may be beneficial to set the parameters by adjusting the degree of inflation of each of the right rotation bladder 48 and the left rotation bladder 50 and visualizing the rotation of the person support surface 14 in real time as opposed to selecting a particular percentage. The person support surface 14 may be rotated to at least three preview positions. These positions include a left preview position relative to the longitudinal axis 80 of the person support apparatus 10, a flat preview position, and a right preview position relative to the longitudinal axis 80 of the person support apparatus 10.

At decision step 126 of the "Rotation" routine 90 illustrated in FIG. 6, the controller 60 determines whether the "Set By Preview" button 925 on the "Options" screen 910 is selected. Selection of the "Set By Preview" button 925 on the "Options" screen 910, illustrated in FIG. 15, results in the "Set By Preview" screen 950 being generated and starting of the "Set By Preview" subroutine 150 at process step 127. The "Set By Preview" subroutine 150 is illustrated in FIG. 7. The "Set By Preview" screen 950, illustrated in FIG. 16, displays a "Left Turn" section 952 and a "Right Turn" section 954. Within the "Left Turn" section 952, an "Inflate" button 956, a "Deflate" button 958, and a "Set" button 960 are generated. Additionally, within the "Right Turn" section 954, an "Inflate" button 962, a "Deflate" button 964, and a "Set" button 966 are generated.

In embodiments, a "P&V" button 961 is displayed in the "Left Turn" section 952 and a "P&V" button 967 is displayed in the "Right Turn" section 954. The "P&V" button 961 and the "P&V" button 967 are similar to the "P&V" button 618 discussed herein. However, the "P&V" button 961 and the "P&V" button 967 may be configured to selectively activate the left P& V bladder 51 and the right P&V bladder 49, respectively. As shown, in the embodiment illustrated in FIG. 16, the left P&V bladder 51 is toggled to the ON state and the right P&V bladder 49 is toggled to the OFF state. However, selection of either of the "P&V" button 961 and the "P&V" button 967 may switch the state of the respective P&V bladders 49, 51. As such, this permits the right P&V bladder 49 and the left P&V bladder 51 to be selectively controlled from within the "Set By Preview" screen 950 without having to return to the "Rotation Setup" screen 610 or the "Therapy" screen 580.

The controller 60 monitors inputs on the "Set By Preview" screen 950 at process step 152 of the "Set By Preview" subroutine 150. At decision step 154, the controller 60 determines whether one of the buttons within the "Left Turn" section 952 is selected. If the controller 60 determines that the "Inflate" button 956 is selected at decision step 156, the left rotation bladder 50 is incrementally inflated a predefined amount at process step 158. The "Set By Preview" subroutine 150 then proceeds back to process step 152 to continue monitoring for inputs. If the controller 60 determines that the "Inflate" button 956 is not selected at decision step 156, the "Set By Preview" subroutine 150 proceeds to decision step 160 at which the controller 60 determines whether the "Deflate" button 958 is selected. If the controller 60 determines that the "Deflate" button 958 is selected at decision step 160, the left rotation bladder 50 is incrementally deflated a predefined amount at process step 162. The "Set By Preview" subroutine 150 then proceeds back to process step 152 to continue monitoring for inputs. As such, it should be appreciated that the caregiver may alternate between inflating and deflating the left rotation bladder 50 by selecting the "Inflate" button 956 and the "Deflate" button 958, respectively. If the controller 60 determines that the "Deflate" button 958 is not selected at decision step 160, the "Set By Preview" subroutine 150 proceeds to decision step 164 at which the controller 60 determines whether the "Set" button 960 is selected. If the controller 60 determines that the "Set" button 960 is selected, the specific degree of inflation of the left rotation bladder 50 is converted to a percentage and, at process step 166, the specific parameter of the left rotation bladder 50 is updated in the "Parameters" screen 810 illustrated in FIG. 14.

The above process may be repeated with respect to the buttons in the "Right Turn" section 954 to set the particular inflation percentage of the right inflation bladder 48 without entering the percentage itself. Specifically, if the controller 60 determines, at decision step 154, that one of the buttons within the "Left Turn" section 952 is not selected, the "Set By Preview" subroutine 150 proceeds to decision step 168 to determine whether one of the buttons within the "Right Turn" section 954 is selected. If so, the controller 60 determines, at decision step 170, whether the "Inflate" button 962 is selected. If the controller 60 determines that the "Inflate" button 962 is selected, the right rotation bladder 48 is incrementally inflated a predefined amount at process step 172. The "Set By Preview" subroutine 150 then proceeds back to process step 152 to continue monitoring for inputs. If the controller 60 determines that the "Inflate" button 962 is not selected at decision step 170, the "Set By Preview" subroutine 150 proceeds to decision step 174 at which the controller 60 determines whether the "Deflate" button 964 is selected. If the controller 60 determines that the "Deflate" button 964 is selected at decision step 174, the right rotation bladder 48 is incrementally deflated a predefined amount at process step 176. The "Set By Preview" subroutine 150 then proceeds back to process step 152 to continue monitoring for inputs. As such, it should be appreciated that the caregiver may alternate between inflating and deflating the right rotation bladder 48 by selecting the "Inflate" button 962 and the "Deflate" button 964, respectively. If the controller 60 determines that the "Deflate" button 964 is not selected at decision step 174, the "Set By Preview" subroutine 150 proceeds to decision step 178 at which the controller 60 determines whether the "Set" button 966 is selected. If the controller 60 determines that the "Set" button 966 is selected, the specific degree of inflation of the right rotation bladder 48 is converted to a percentage and, at process step 180, the specific parameter of the right rotation bladder 48 is updated in the "Parameters" screen 810 in FIG. 14.

Figure 16:
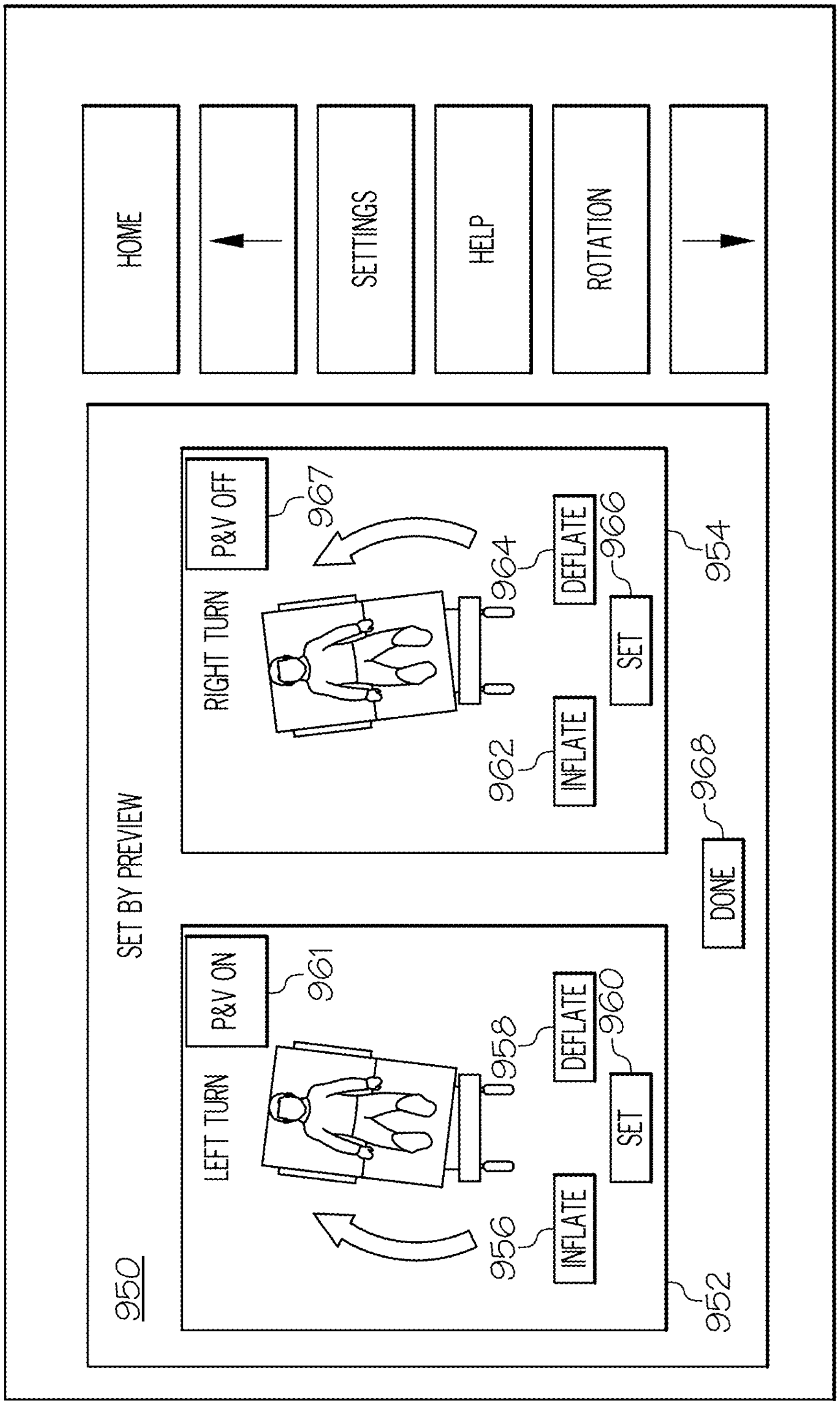
FIG. 16 schematically depicts a view of a "Set By Preview" screen displayed on the user interface, according to one or more embodiments shown and described herein.

As shown in FIG. 16, a "Done" button 968 is generated on the "Set By Preview" screen 950. If neither a button in the "Left Turn" section 952 nor the "Right Turn" section 954 is selected, the controller 60 determines, at decision step 182, whether the "Done" button 968 is selected. If it is determined that the "Done" button 968 is not selected at decision step 182, the "Set By Preview" subroutine 150 returns to process step 152 to continue monitoring for inputs. Alternatively, if the controller 60 determines that the "Done" button 968 is selected at decision step 182, the caregiver is returned to the "Options" screen 910, illustrated in FIG. 15, at process step 184.

The "Preview" subroutine 750 allows caregivers to see the rotation settings without waiting for the dwell or hold time, as set forth above. Activating the "Preview" button 920 rotates the person support surface 14 without dwell or hold time while the person is on the person support surface 14 allowing the caregiver to evaluate the settings. The person support surface 14 may be rotated to at least three evaluation positions. These positions include left rotation relative to the longitudinal axis 80 of the person support apparatus 10, flat position, and right rotation relative to the longitudinal axis 80 of the person support apparatus 10.

Figure 17:
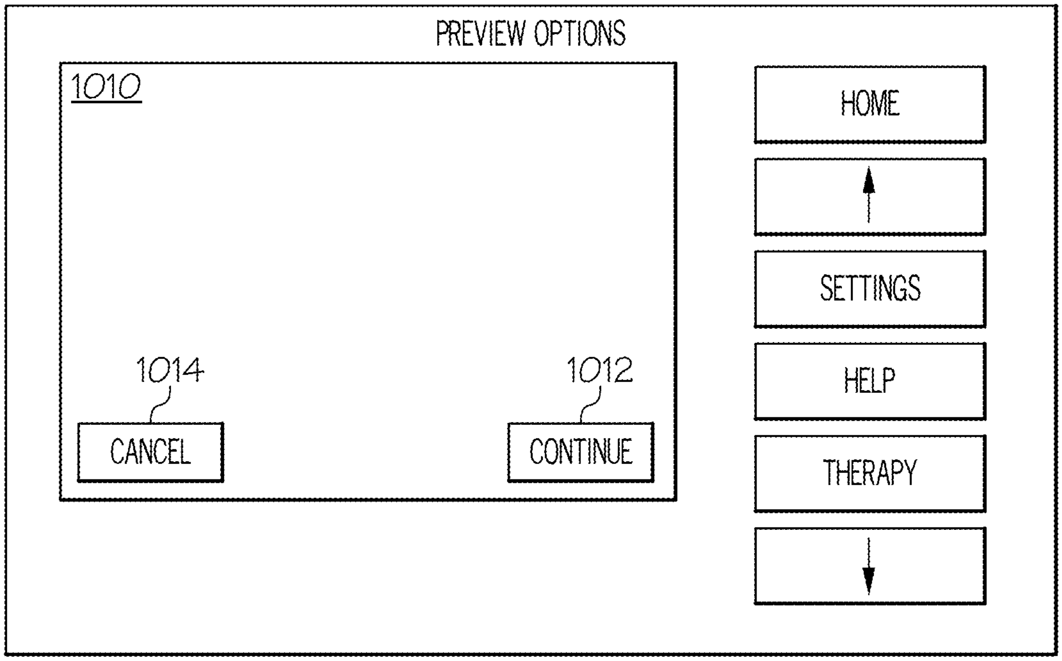
FIG. 17 schematically depicts a view of a "Preview Options" screen displayed on the user interface, according to one or more embodiments shown and described herein.
Figure 18:
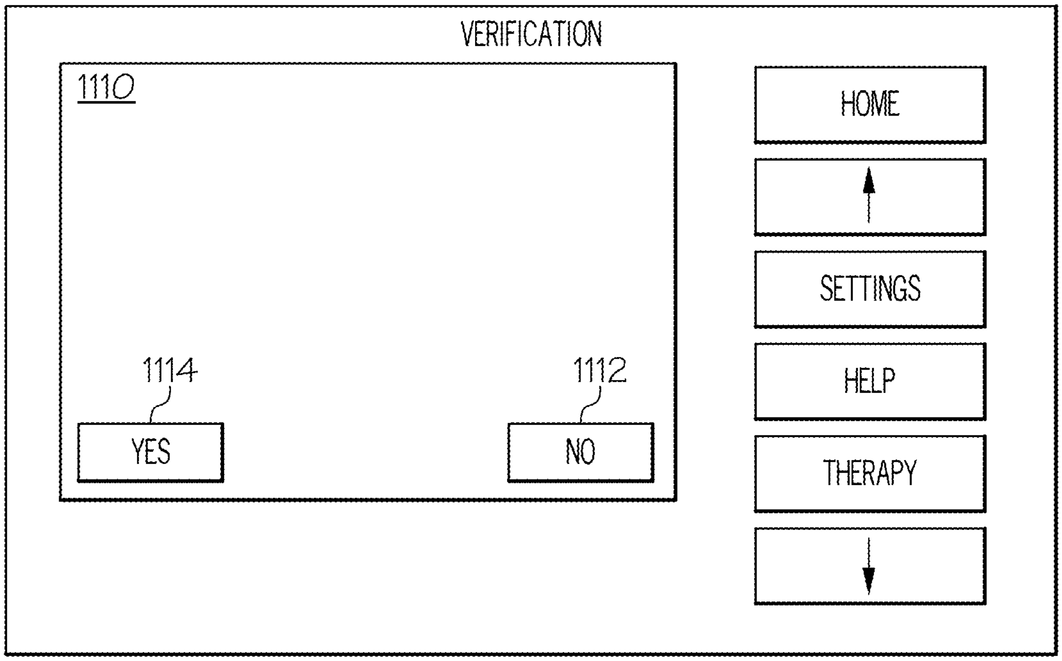
FIG. 18 schematically depicts a view of a "Verification" screen displayed on the user interface, according to one or more embodiments shown and described herein.

The "Preview" subroutine 750 is illustrated in FIG. 8. The controller 60 starts the "Preview" subroutine 750 at process step 128 in response to the "Preview button" 920 (FIG. 15) being selected by the caregiver at decision step 126 of FIG. 6. A "Preview Options" screen 1010, illustrated in FIG. 17, provides information about the preview process to the caregiver, at process step 210. A "Continue" button 1012 and a "Cancel" button 1014, are generated on the "Preview Options" screen 1010 of the user interface 40, at process step 210. The controller 60, at decision step 212, determines whether the "Continue" button 1012 has been selected. Selection of the "Continue" button 1012, at decision step 212, results in the generation, at decision step 216, of buttons on a "Verification" screen 1110 to verify the entry of initial parameters, as illustrated in FIG. 18. A caregiver's response to the buttons on the "Verification" screen 1110 ensures that the rotation parameters have been entered prior to the start of the preview process. At decision step 218, the controller 60, determines if the initial parameters have been entered. The caregiver may select either a "Yes" button 1114 or a "No" button 1112. At process step 219, selection of the "No" button 1112 results in a return of the "Rotation Setup" screen 610 at process step 110 of the "Rotation" routine 90 illustrated FIG. 6. The caregiver is then prompted to select one of the three buttons at process step 112.

Figure 9:
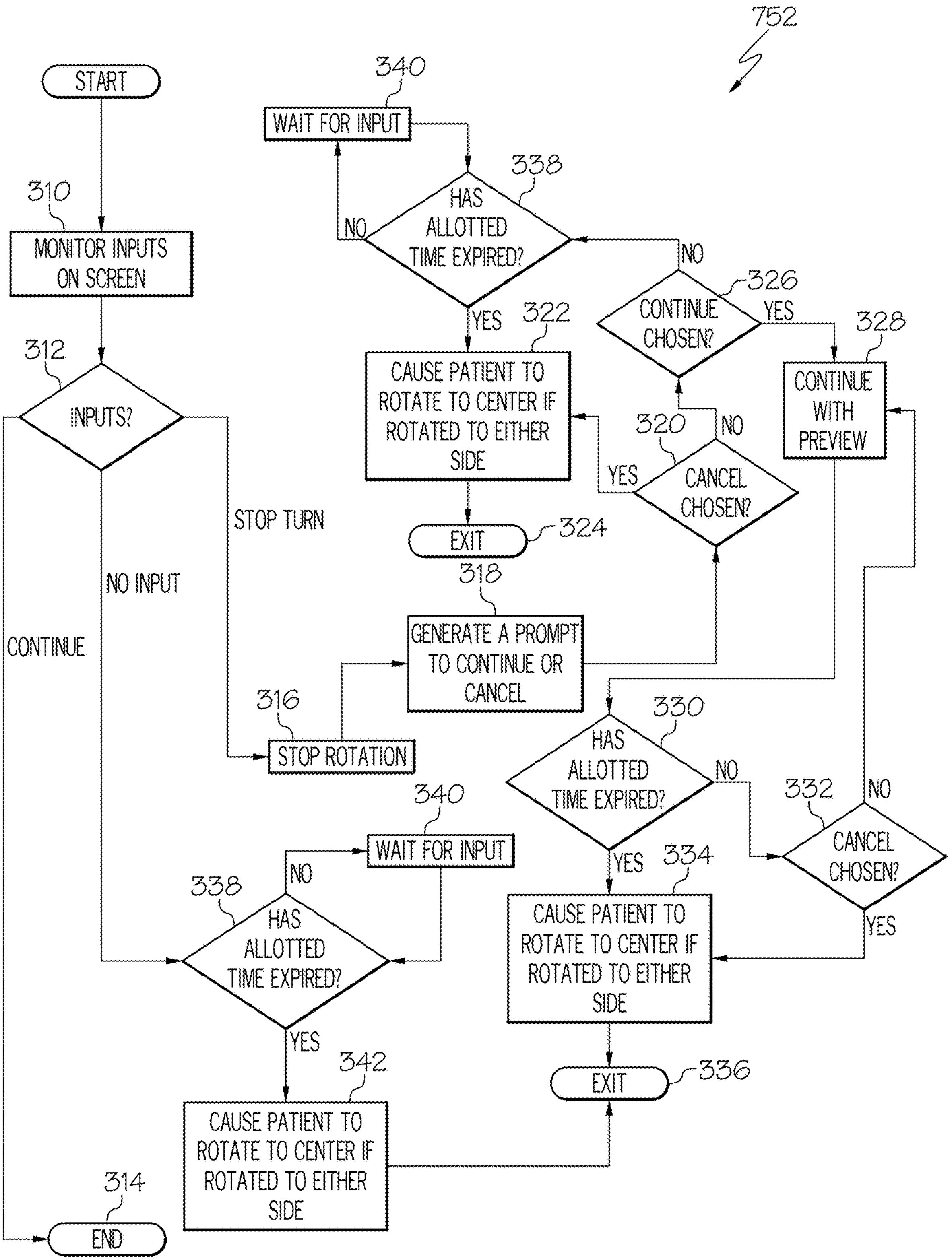
FIG. 9 is a flow chart illustrating an algorithm that executes an evaluation subroutine, according to one or more embodiments shown and described herein.
Figure 19:
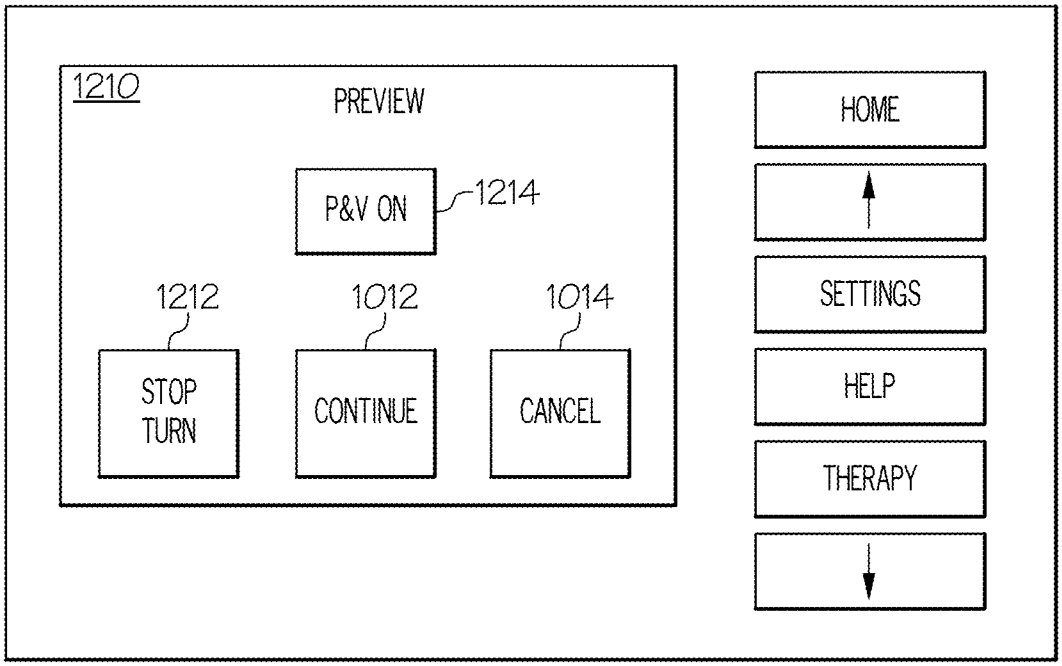
FIG. 19 schematically depicts a view of a "Preview" screen displayed on the user interface, according to one or more embodiments shown and described herein.

Alternatively, selection of the "Yes" button 1114, causes the controller 60 to rotate the person support surface 14 to the left side through actuation of the bladder system 47, at process step 220. A "Preview" screen 1210 of the user interface 40 is illustrated in FIG. 19. The "Preview" screen 1210 includes a "Stop Turn" button 1212, a "Continue" button 1012, and a "Cancel" button 1014. An "Evaluation" subroutine 752, illustrated in FIG. 9, is implemented at process step 222. The person support surface 14 is rotated to the left side during a left turn evaluation period for the left turn predetermined time. During the left turn predetermined time, the caregiver has an opportunity to examine all the external cords or lines associated with the person support apparatus 10 and ensure that all lines and attachments are in functional order. Furthermore, in some instances the weight of the person may prevent the right rotation bladder 48 and the left rotation bladder 50 from inflating according to the rotation angle specified by the parameter settings. In those cases, the caregiver may evaluate the rotation of the person support surface 14 and alter the parameter setting during this preview phase.

In embodiments, a "P&V" button 1214, similar to the "P&V" button 618 discussed herein, is generated on the "Preview" screen 1210 for toggling the right P&V bladder 49 and the left P&V bladder 51 between the ON state and the OFF state during the "Evaluation" subroutine 752. It should be appreciated that additional "P&V" buttons, similar to those discussed herein, may be displayed on screens other than those specifically discussed herein to provide control over the right P&V bladder 49 and the left P&V bladder 51 during any particular subroutine.

Figure 20:
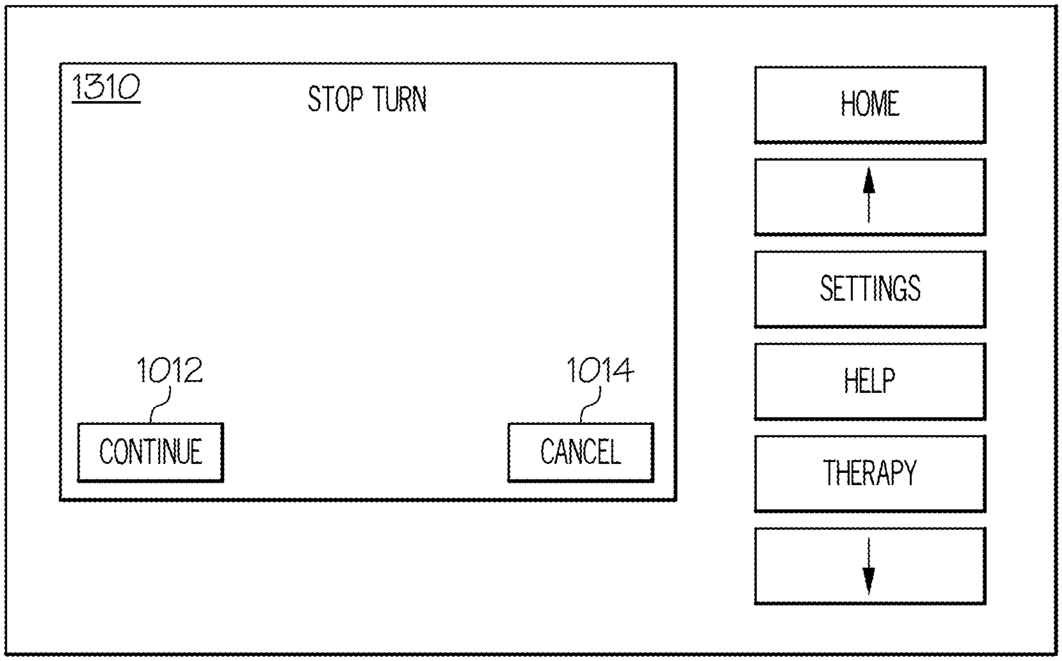
FIG. 20 schematically depicts a view of a "Stop Turn" screen displayed on the user interface, according to one or more embodiments shown and described herein.

During the "Evaluation" subroutine 752, illustrated in FIG. 9, the "Continue" button 1012 and the "Stop Turn" button 1212, are monitored by the controller 60 at process step 310. Selection of the "Continue" button 1012, at decision step 312, causes the "Evaluation" subroutine 752 to complete the evaluation, at process step 314. Selection of the "Stop Turn" button 1212, at decision step 312, causes the rotation of the person support surface 14 to stop, at process step 316. A "Stop Turn" screen 1310, as illustrated in FIG. 20, generates the "Cancel" button 1014 and the "Continue" button 1012 on the user interfaces 40, at process step 318. Selection of the "Cancel" button 1014, at decision step 320, results in the controller 60 causing the person to rotate back to the center through actuation of the bladder system 47, at process step 322. This ensures that the person is moved back to a position where the person's back is parallel to the ground. The controller 60, at process step 324, ends the "Evaluation" subroutine 752 and exits from the "Preview" subroutine 750.

If the "Cancel" button 1014 is not selected by the caregiver at decision step 320, the controller 60 determines if the "Continue" button has been selected, at decision step 326. Selection of the "Continue" button 1012, at decision step 326, results in the continuation of the "Preview" subroutine 750 at the current evaluation step, at process step 328. At decision step 330, if the controller 60 determines that a threshold time, i.e., the left turn predetermined time, has not been exceeded, the "Preview" subroutine 750 is continued from the current point of evaluation.

The caregiver may select the "Cancel" button 1014 at any time. If the "Cancel" button 1014 is selected, at decision step 332, the controller 60 rotates the person back to the center through actuation of the bladder system 47, at process step 334. The controller 60 exits the "Preview" subroutine 750 at the current point of the "Evaluation" subroutine 752, at process step 336. If the "Cancel" button 1014 is not selected at decision step 332 and the threshold time has not been exceeded, the "Preview" subroutine 750 is continued at the current point of the "Evaluation" subroutine 752 that is being executed. The controller 60, at decision step 224, determines if the "Evaluation" subroutine 752 of the left side is completed, and then rotates the person back to the center through actuation of the bladder system 47.

If the controller 60 determines that no input has not been selected at decision step 312, the controller 60 determines whether the threshold time has been exceeded, at decision step 338. It the threshold time is not exceeded, at process step 340, the controller 60 awaits an input from the caregiver. The threshold time is continuously monitored and once that time is exceeded, the person is rotated back to the center by through actuation of the bladder system 47, at process step 342.

Figure 21:
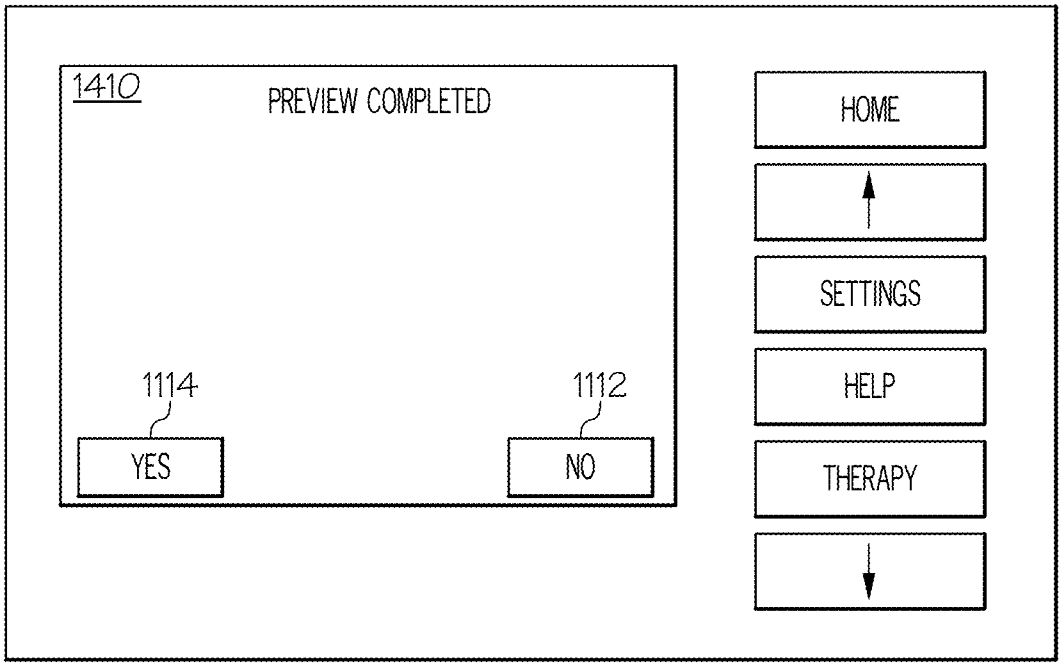
FIG. 21 schematically depicts a view of a "Preview Completed" screen displayed on the user interface, according to one or more embodiments shown and described herein.

Following the rotation of the person on the person support surface 14 to the center, the "Evaluation" subroutine 752 is again implemented, at process step 226 of "Preview" subroutine 750. After the implementation of the "Evaluation" subroutine 752, the controller 60 determines if the "Evaluation" subroutine 752 is completed, and the person is rotated to the right side for a right turn predetermined time through actuation of the bladder system 47, at process step 228. Following the rotation of the person support surface 14 to the right side, the "Evaluation" subroutine 752 is again implemented, at process step 230. The controller 60, at decision step 232, determines if the "Evaluation" subroutine 752 of the right side is completed, and then rotates the person back to the center through actuation of the bladder system 47. Notably, between evaluating the right turn and the left turn, the person may be placed in the flat position for the flat predetermined period of time, so that the person and lines may be assessed when moving from the right turn to the left turn. At process step 234, the controller 60 generates a "Preview Completed" screen 1410, as illustrated in FIG. 21.

The controller 60, at decision step 236, determines if the "Yes" button 1114 or "No" button 1112 is selected on the "Verification" screen 1110. Selection of the "Yes" button 1114 causes the reappearance of the "Rotation Setup" screen 610 on the user interface 40, at process step 238. Selection of the "No" button 1112 results in the continuation of the preview process, at process step 240. At process step 242, the duration of the time that the preview process is ongoing is continuously determined. If the time exceeds a certain threshold time determined previously by the caregiver, the controller 60 causes the person to rotate back to the center through actuation of the bladder system 47, at process step 244. This ensures that the person is moved back to a position such that the person's back is parallel to the ground, and that the person does not remain rotated to the left or right for an extended period of time. The "Preview" subroutine 750 is then exited, at process step 246. At decision step 242, if the controller 60 determines that the threshold time has not been exceeded, the preview subroutine is continued until the controller 60 determines that the threshold time has been exceeded.

At decision step 212, if the "Continue" button 1012 is not selected, the controller 60 determines if the "Cancel" button 1014 has been selected, at decision step 214. Selection of the "Cancel" button 1014 causes the person to rotate back to the center through actuation of the bladder system 47, at process step 252, if the person is currently rotated to either side. The "Preview" subroutine 750 is exited, at process step 248. However, if neither the "Continue" button 1012 is selected at decision step 212, nor the "Cancel" button 1014 is selected at decision step 214, the controller 60 determines the duration of the time the preview process has been ongoing, at decision step 250.

If the time exceeds a certain threshold time previously determined by the caregiver, the controller 60 causes the person to rotate back to the center by rotating the person support surface 14 to center if the person is currently rotated to either side, at process step 252. This ensures that the person is moved back to a position such that the person's back is parallel to the ground, and that the person does not remain rotated to the left or right for an extended period of time. The "Preview" subroutine 750 is then exited, at process step 248. At decision step 250, if the controller 60 determines that the threshold time has not been exceeded, the "Preview" subroutine 750 is continued, and the controller 60 awaits an input from the caregiver, at decision step 254. The threshold time is continuously monitored, and once that time is exceeded, the controller 60 proceeds to process step 252 and rotates the person back to the center through actuation of the bladder system 47.

The determination of the threshold time is important so that the person does not remain in either the left rotated position or right rotated position for a length of time that is detrimental to the person's health. In the instances when the caregiver is forced to leave the person side before completing the preview process, the monitoring of this threshold time ensures that the person is returned to a flat position within a certain time period.

After evaluation, the caregiver may select, at decision step 114 of the "Rotation" routine 90, the "Therapy" button 614 of the "Rotation Setup" screen 610, illustrated in FIG. 12. Accordingly, therapy is started by the controller 60, at process step 140, illustrated in FIG. 6. After the completion of therapy, the "Rotation" routine 90 is ended, at process step 142.

Figure 22:
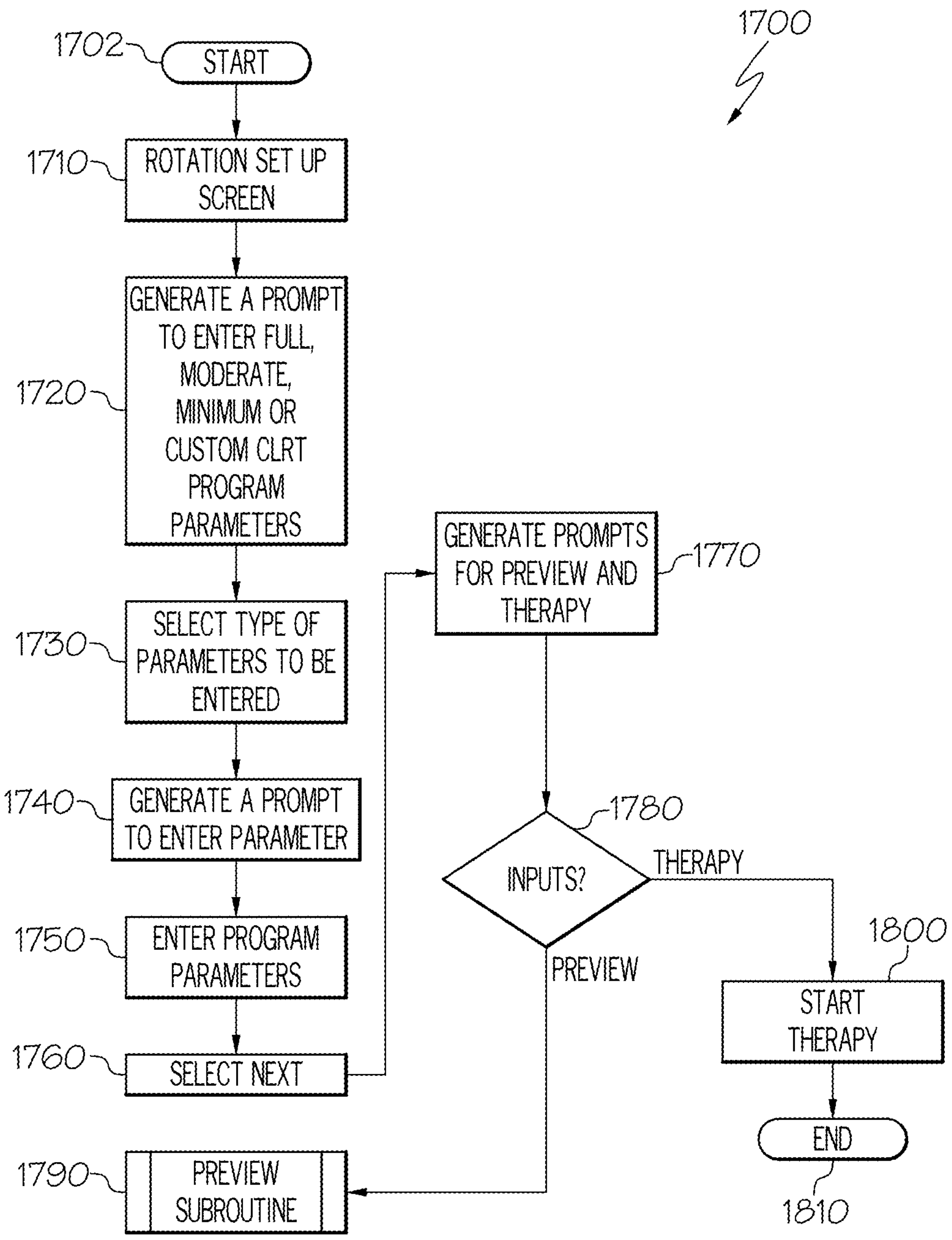
FIG. 22 is a flow chart illustrating an algorithm that executes an alternative rotation routine, according to one or more embodiments shown and described herein.
Figure 24:
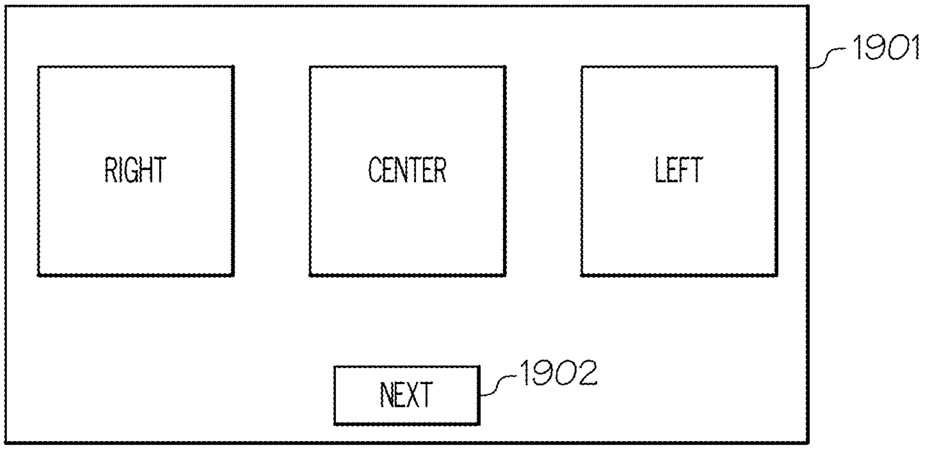
FIG. 24 schematically depicts a view of a "Parameters" screen displayed on the user interface, according to one or more embodiments shown and described herein.
Figure 25:
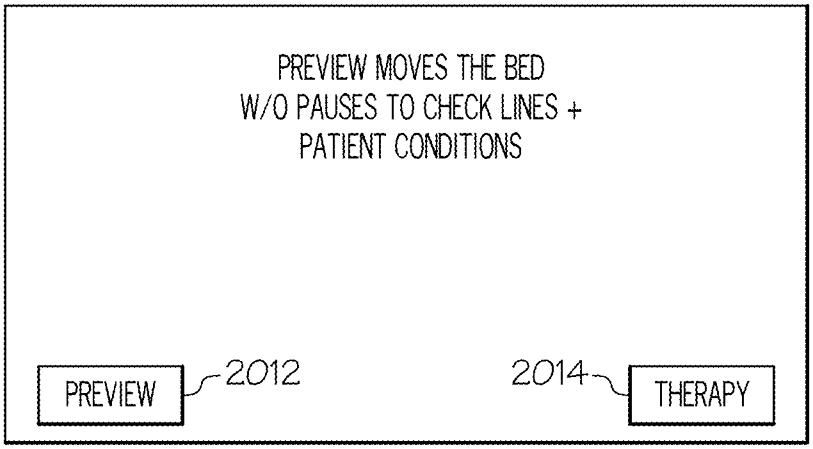
FIG. 25 schematically depicts a view of a "Preview Options" screen displayed on the user interface, according to one or more embodiments shown and described herein.

Referring now to FIG. 22, an alternative "Rotation" routine 1700 is started at process step 1702. The controller 60, at decision step 1710, determines if the "Rotation Setup" screen 610 is generated by the caregiver upon selection of the "Rotation" button 520 on the "Therapy" screen 580. As discussed herein, selection of the "Rotation" button 520 results in generation of four buttons for the entry of program parameters, at decision step 1720. The parameter buttons include the "Full" parameter 712, the "Moderate" parameter 714, the "Minimum" parameter 716, and the "Custom" parameter 718. In the instance that the "Custom" parameter 718 is selected at decision step 1730, buttons are generated to enter the custom parameters, at decision step 1740. The "Parameters" screen 1901, illustrated in FIG. 24, includes parameters of right rotation, center rotation and left rotation that are entered at decision step 1750. When entry of the parameters is completed, selection of a "Next" button 1902, at decision step 1760, results in the generation of two buttons, a "Preview" button 2012 and a "Therapy" button 2014, at process step 1770, similar to those shown in FIG. 25. In some embodiment, the "Parameters" screen 1901 includes the "Preview" button 2012 and the "Therapy" button 2014 instead of the "Next" button 1902, and process step 1770 immediately follows decision step 1750.

Selection of the "Therapy" button 2014, at decision step 1780, results in that input being received by the controller 60 and the therapy being initiated, at process step 1800. Once therapy is completed, the process is ended, at process step 1810.

Figure 23:
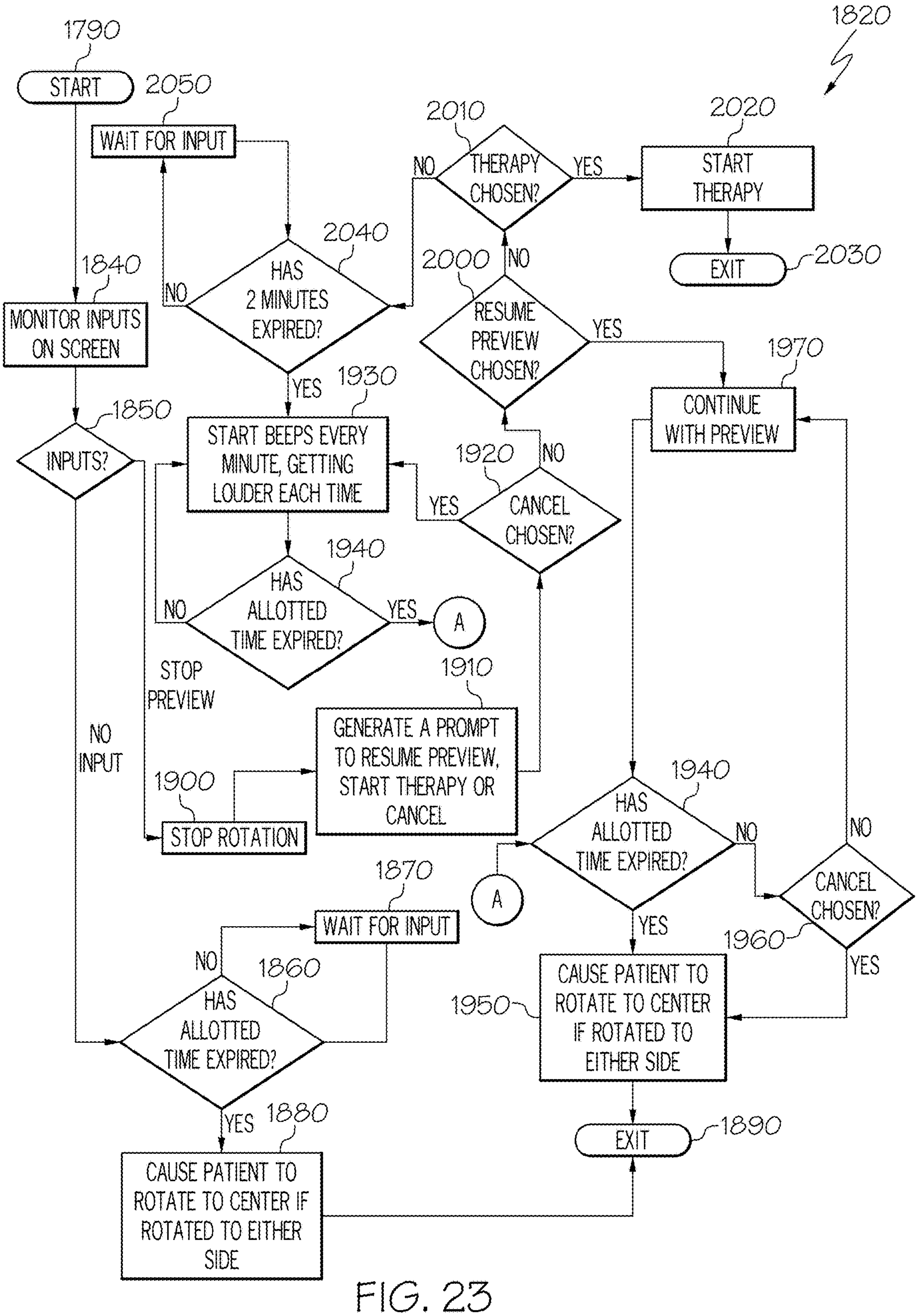
FIG. 23 is a flow chart illustrating an algorithm that executes an alternative preview subroutine of the rotation routine, according to one or more embodiments shown and described herein.
Figure 26:
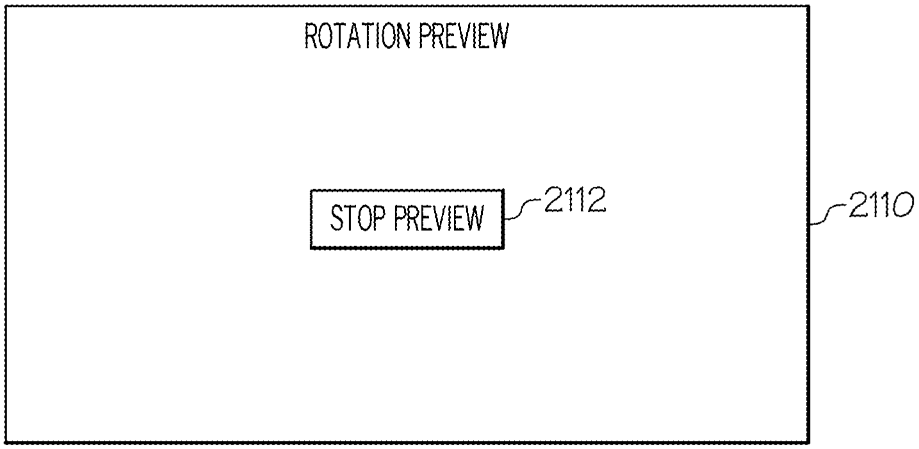
FIG. 26 schematically depicts a view of a "Rotation Preview" screen displayed on the user interface, according to one or more embodiments shown and described herein.

If the caregiver selects the "Preview" button 2012 at decision step 1780, the controller 60 starts the "Preview" subroutine 1820 illustrated in FIG. 23, at step 1830, and generates the "Rotation Preview" screen 2110 displaying a "Stop Preview" button 2112, as illustrated in FIG. 26. At process step 1840, the controller 60 monitors the user inputs to determine whether the "Stop Preview" button 2112 has been selected. If no input is entered, at decision step 1850, the controller 60 continues to decision step 1860 to determine whether a predetermined period of time has expired. If the predetermined period of time has not expired, the controller 60 continues to wait for an input, at process step 1870. If the predetermined period of time has expired, the controller 60 moves the person back to the flat position, at process step 1880, and the preview is ended, at process step 1890.

Figure 27:
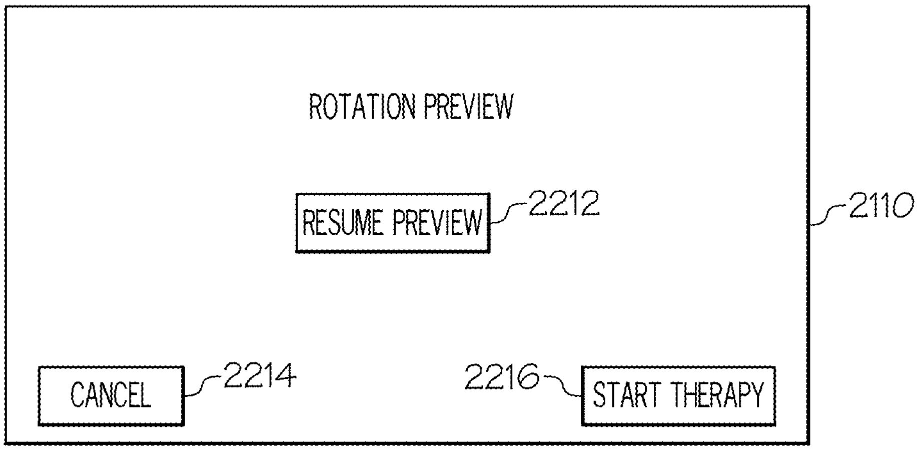
FIG. 27 schematically depicts a view of a "Resume Preview" screen displayed on the user interface, according to one or more embodiments shown and described herein.

If the "Stop Preview" button 2112 is selected, at decision step 1850, the controller 60 stops rotation of the person support surface 14, at process step 1900. At process step 1910, the controller 60 generates the "Rotation Preview" screen 2110, illustrated in FIG. 27. The "Rotation Preview" screen 2110 includes a "Resume Preview" button 2212, a "Cancel" button 2214, and a "Start Therapy" button 2216. At decision step 1920, the controller 60 determines whether the "Cancel" button 2214 has been selected. If the "Cancel" button 2214 has been selected, the controller 60 generates an alarm, for example, a beep every minute, with the beeps getting louder each minute, at process step 1930. The controller 60 then determines whether the predetermined period of time has expired, at process step 1940. If the predetermined period of time has not expired, the beeps continue, at process step 1930. During this time, the controller 60 determines whether the "Cancel" button 2214 has been selected, at decision step 1960. If the "Cancel" button 2214 is selected, the controller 60, at process step 1950, moves the person support surface 14 back to center, and the process ends, at process step 1890. If the "Cancel" button 2214 is not selected, the controller 60 continues the preview, at process step 1970. If the predetermined period of time has expired, the controller 60, at process step 1950, moves the person support surface 14 back to center, and the process ends, at process step 1890.

At the decision step 1920, if the "Cancel" button 2214 is not chosen, the controller 60 determines, at decision step 2000, whether the "Resume Preview" button 2212 has been selected. If the "Resume Preview" button 2212 is selected, the preview continues, at process step 1970. If the "Resume Preview" button 2212 is not selected, the controller 60 determines whether the "Start Therapy" button 2216 has been selected, at decision step 2010. If the "Start Therapy" button 2216 has been selected, the therapy starts, at process step 2020. At the conclusion of therapy, the process ends, at process step 2030. If the "Start Therapy" button 2216 is not selected, the controller 60 determines whether two minutes has expired, at decision step 2040. If two minutes has not expired, the controller 60 continues to wait for an input, at process step 2050. If two minutes has expired, the controller 60 generates an alarm, for example, a beep every minute, with the beeps getting louder each minute, at process step 1930.

Figure 30:
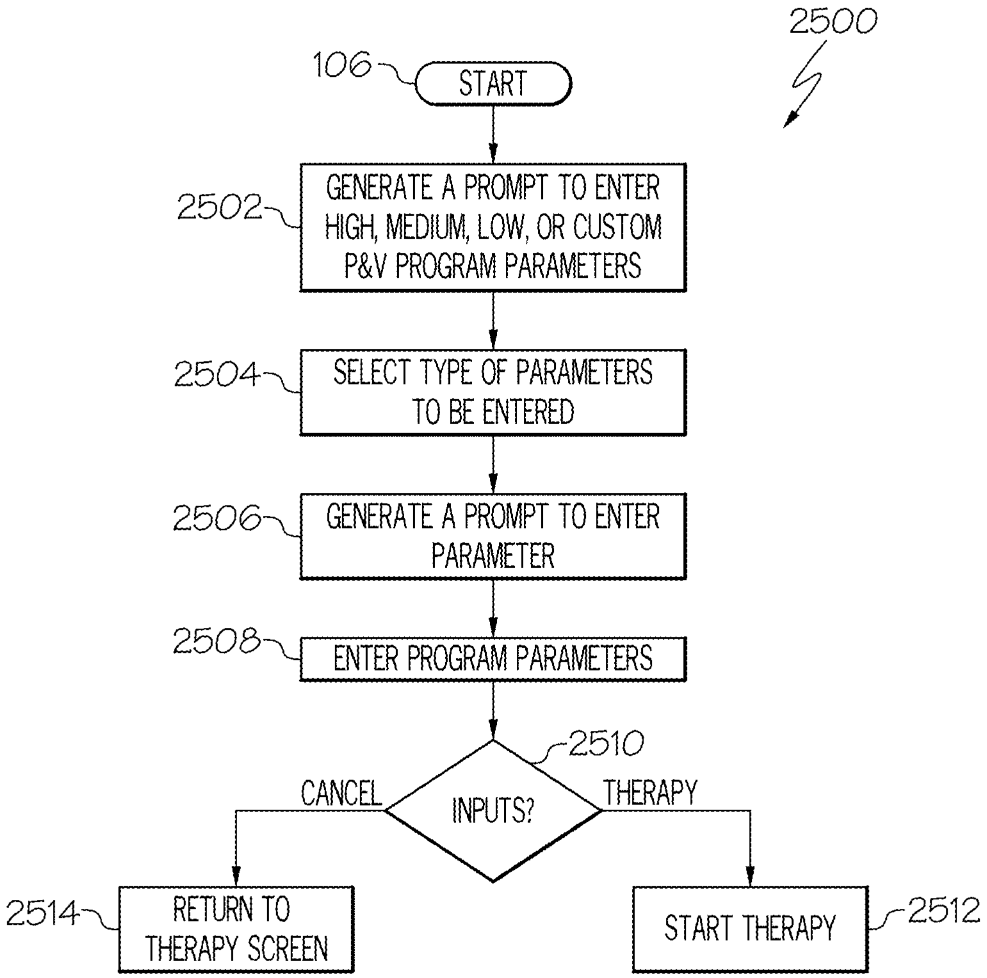
FIG. 30 is a flow chart illustrating an algorithm that executes a P&V subroutine of the rotation routine, according to one or more embodiments shown and described herein.

Referring again to FIG. 6, if the "P&V" button 530 is selected, at decision step 105, a "P&V" subroutine 2500 (FIG. 30) is started at process step 106. The "P&V Setup" screen 2300, illustrated in FIG. 28, is generated at decision step 105 in response to the "P&V" button 530 being selected. The "P&V" button 530 provides information about the P&V process to the caregiver, at process step 2502. Specifically, selection of the "P&V" button 530 allows for the caregiver to adjust parameters for the percussion and or vibration therapy, as set forth above, and results in the generation of parameters buttons for the entry of program parameters at process step 2502. The parameter buttons include a "High" parameter 2302, a "Medium" parameter 2304, a "Low" parameter 2306, and a "Custom" parameter, which are shown in the "P&V Setup" screen 2300 illustrated in FIG. 28. The controller 60, at decision step 2504, determines which parameter 2302, 2304, 2306, 2308 has been selected. The "High" parameters 2302 enables the caregiver to select a predetermined high percussion and vibration effect. It should be noted that high percussion and vibration may include other characteristics such as, for example, vibration at a predetermined high frequency and/or for a predetermined long period of time. The "Medium" parameter 2304 enables the caregiver to select an intensity of the percussion and vibration that is less than the intensity experienced when selecting the "High" parameter 2302. The "Low" parameter 2306 enables the caregiver to select an intensity of the percussion and vibration that is less than the intensity experienced when selecting the "Medium" parameter 2304. The controller 60, at decision step 2504, determines which parameter 2302, 2304, 2306, 2308 has been selected. If the "Custom" parameter 2308 is selected, the controller 60 generates buttons to enter custom parameters on a "Parameters" screen 2400, at process step 2506.

Figure 29:
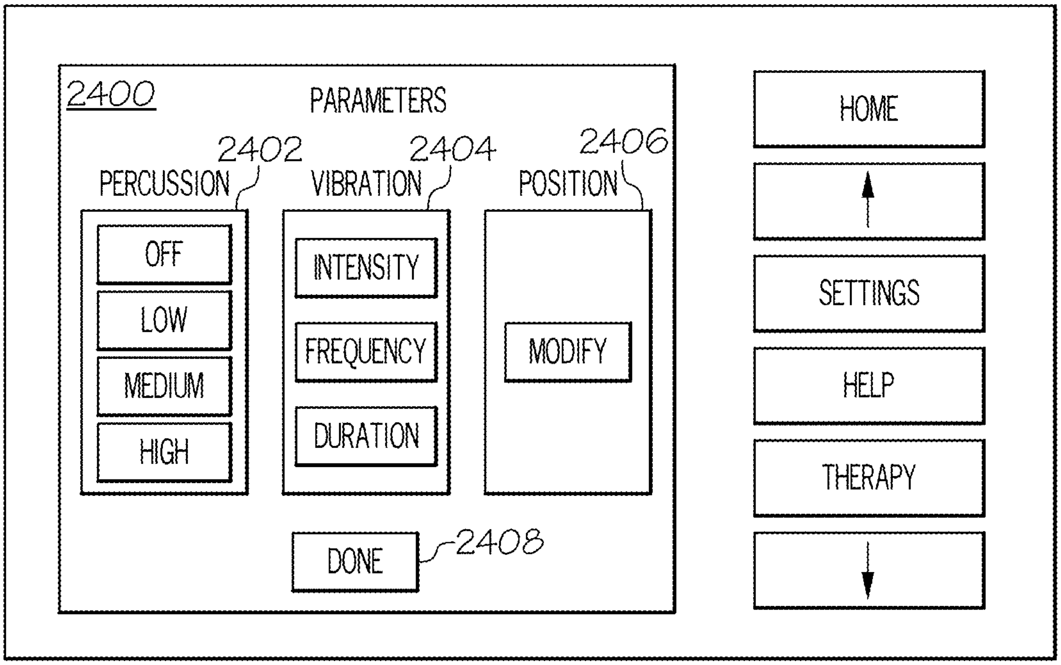
FIG. 29 schematically depicts a view of a "Parameters" screen displayed on the user interface, according to one or more embodiments shown and described herein.

The "Parameters" screen 2400, illustrated in FIG. 29, provides custom parameters enabling the caregiver to enter a specific intensity for each of percussion and vibration at process step 2508. Additionally, the custom parameters may also permit the caregiver to select a specific frequency and duration of vibration, as well as a position of the percussion and vibration, particularly the right P&V bladder 49 and the left P&V bladder 51. As such, one or more custom percussion buttons 2402 are generated, one or more custom vibration buttons 2404 are generated, and one or more custom position buttons 2406 are generated. When the entry of the parameters is completed, selection of a "Done" button 2408, returns the caregiver to the "P&V Setup" screen 2300 shown in FIG. 28.

Figure 31:
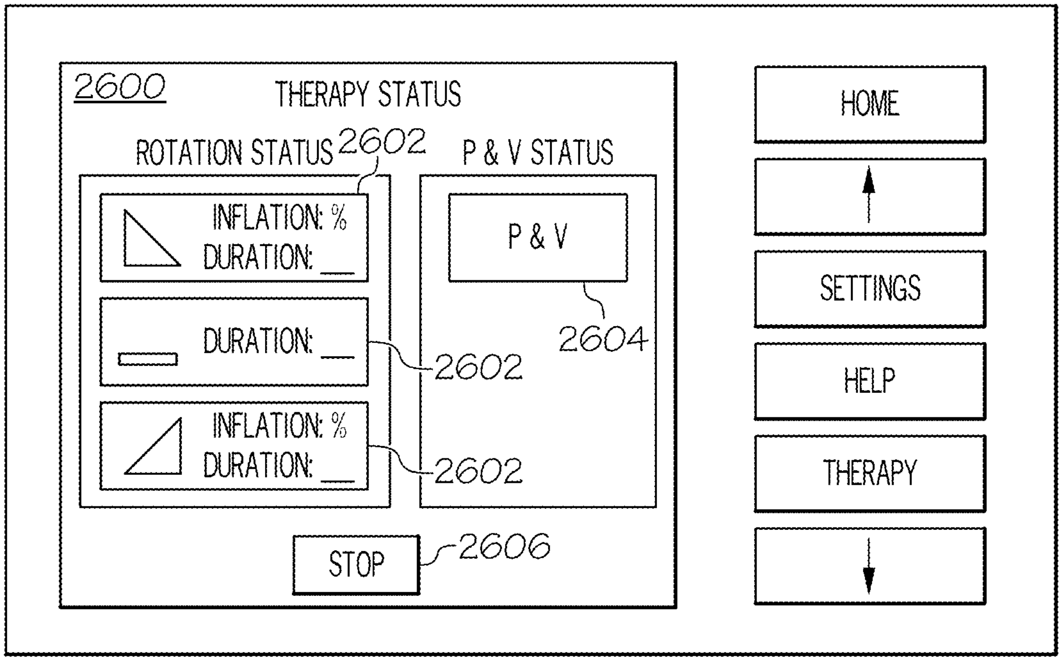
FIG. 31 schematically depicts a view of a "Therapy Status" screen displayed on the user interface, according to one or more embodiments shown and described herein.

As shown in the "P&V Setup" screen 2300 in FIG. 28, a "Cancel" button 2310 and a "Therapy" button 2312 are also generated below the parameters buttons. The controller 60, at decision step 2510, determines which button has been selected. If the "Cancel" button 2310 is selected, the caregiver is returned to the "Therapy" screen 580, illustrated in FIG. 11, at process step 2514. Alternatively, if the "Therapy" button 2312 is selected, therapy is started by the controller 60, at process step 2512 and a "Therapy Status" screen 2600, illustrated in FIG. 31, is generated and a "Therapy" subroutine 2800, illustrated in FIG. 33, is started, at process step 140.

Figure 33:
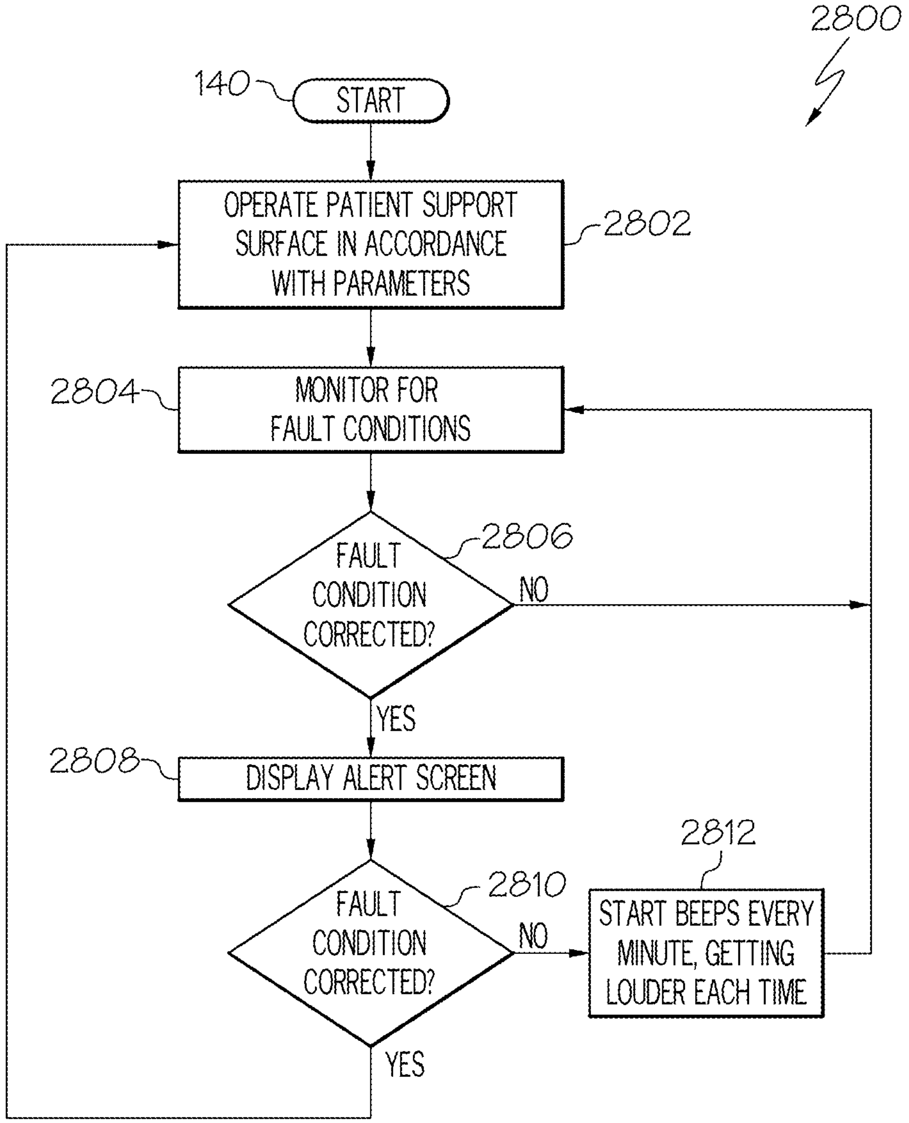
FIG. 33 is a flow chart illustrating an algorithm that executes a fault condition subroutine, according to one or more embodiments shown and described herein.

During operation of the "Therapy" subroutine 2800, illustrated in FIG. 33, the person support surface 14 is rotated, at process step 2802, based on the rotation parameters selected. Additionally, at process step 2802, the "Therapy Status" screen 2600 is generated in which a rotation status and a P&V status of the person support apparatus 10 is displayed. In embodiments, one or more rotation status buttons 2602 may be generated on the "Therapy Status" screen 2600. Selection of any of the one or more rotation status buttons 2602 may return the caregiver to the "Rotation Setup" screen 610 or the "Settings" screen 710 so that the particular settings and parameters of the right rotation bladder 48 and the left rotation bladder 50 may be modified. In embodiments, one or more P&V status buttons may be generated on the "Therapy Status" screen 2600. Selection of any of the one or more P&V status buttons 2604 may return the caregiver to the "P&V Setup" screen 2300 or the "Parameters" screen 2400 so that the particular settings and parameters of the right P&V bladder 49 and the left P&V bladder 51 may be modified. A "Stop" button 2606 is generated on the "Therapy Status" screen 2600. At any point, selection of the "Stop" button 2606 will stop operation of the person support apparatus 10 and return the user interface 40 to the "Therapy" screen 580. In embodiments, a confirmation or verification screen, such as "Verification" screen 1110, may be presented prior to stopping operation of the person support apparatus 10.

During operation of the "Therapy" subroutine 2800, the controller 60 monitors for the presence of a fault condition at process step 2804. A fault condition may be, for example, the mattress head section 32 of the deck frame 22 being inclined or reclined in excess of a predetermined threshold, the mattress foot section 34 being inclined or reclined in excess of a predetermined threshold, one of the left side rail 28 or the right side rail 30 being in a lowered position, or the like. As such, when a fault condition is detected, it should be appreciated that operation of the person support surface 14 in the "Therapy" subroutine is not desired as this presents an increased risk to the person in the person support apparatus 10.

Figure 32:
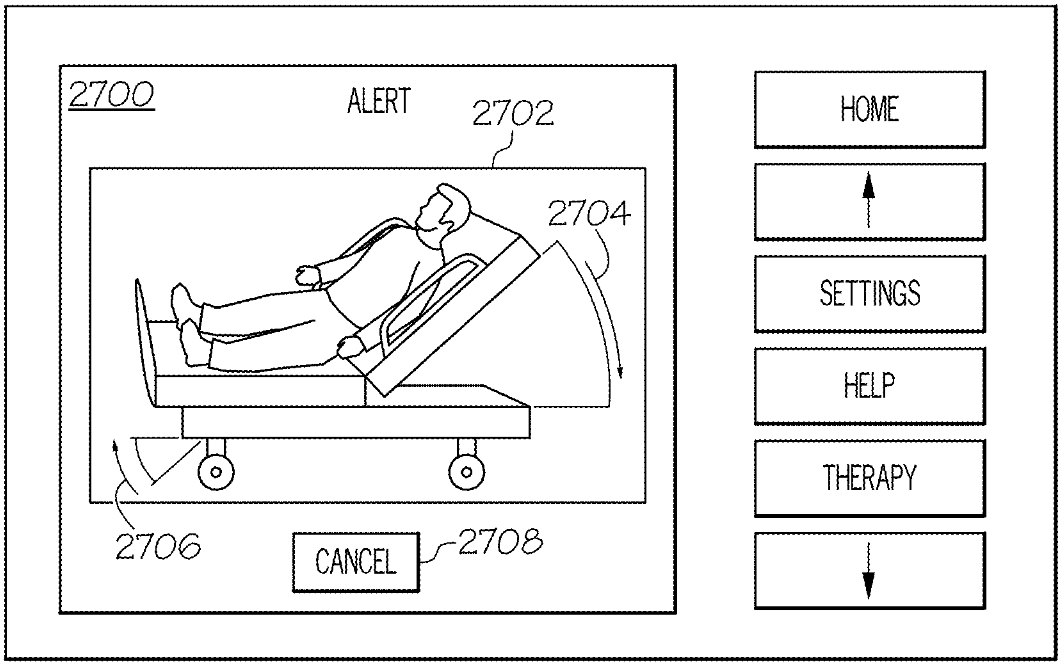
FIG. 32 schematically depicts a view of an "Alert" screen displayed on the user interface, according to one or more embodiments shown and described herein.

If no fault condition is detected at decision step 2806, the "Therapy" subroutine 2800 returns to process step 2804 and the controller 60 continues monitoring for a fault condition. Alternatively, in response to a fault condition being detected at decision step 2806, an "Alert" screen 2700, illustrated in FIG. 32, is displayed on the user interface 40 at process step 2808. In embodiments, the "Alert" screen 2700 may generate a graphical representation 2702 depicting the person support apparatus 10. Specifically, the graphical representation 2702 may highlight various sections indicating the specific fault condition detected. For example, the graphical representation 2702 may generate an arrow 2704 indicating that the mattress head section 32 is inclined or reclined in excess of the predetermined threshold and needs to be lowered. The arrow 2704 may be animated, such as by flashing, changing in size, moving in a particular direction, and the like, to draw attention to the specific area of the graphical representation 2702 that needs to be addressed on the person support apparatus 10. Additionally, the graphical representation 2702 may generate an arrow 2706 indicating that the mattress foot section 34 is inclined or reclined in excess of the predetermined threshold and needs to be lowered. The arrow 2706 may be animated, such as by flashing, changing in size, moving in a particular direction, and the like, to draw attention to the specific area of the graphical representation 2702 that needs to be addressed on the person support apparatus 10. Additionally, the graphical representation 2702 may highlight certain areas representative of the left side rail 28 or the right side rail 30 when it is detected that the left side rail 28 or the right side rail 30 is in a lowered position, as opposed to a raised position. In embodiments, the highlighted sections of the graphical representation 2702 may be selected to display additional information as to the details of the particular fault condition.

Thereafter, at decision step 2810, the controller 60 determines whether the fault condition has been corrected, such as by adjusting the mattress head section 32, the mattress foot section 34, the left side rail 28 or the right side rail 30, as indicated in the graphical representation 2702. If the controller 60 determines at decision step 2810 that the fault condition is no longer present, the caregiver is returned to the "Therapy Status" screen 2600 and the "Therapy" subroutine 2800 returns to process step 2802 such that the person support surface 14 continues to be operated in accordance with the selected parameters. However, after a predetermined period of time of the fault condition not being corrected, for example, 1 minute, 2 minutes, 3 minutes, or the like, the "Therapy" subroutine 2800 proceeds to process step 2812. At process step 2812, the controller 60 generates an alarm, for example, a beep every minute, with the beeps getting louder each minute. The alarm is generated until it is determined that the fault condition is no longer present.

In embodiments, a "Cancel" button 2708 may be generated on the "Alert" screen 2700. In response to the "Cancel" button 2708 being selected, the controller 60 may be overridden to ignore the fault condition and the "Therapy" subroutine may return to process step 2802 for continuing operation of the person support apparatus 10. This may be necessary in instances in which it is required, for example, that the mattress head section 32 and/or the mattress foot section 34 be inclined to a particular degree that would otherwise not be permitted.

It should be appreciated that the above steps 2804-2812 may also be executed during any of the "Rotation" routine 90, the "Preview" subroutine 750, the "Set By Preview" subroutine, and the "P&V" subroutine 2500. Accordingly, during any of the above routines, when a fault condition is detected by the controller 60, operation of the person support surface 14 will be halted until the fault condition is addressed, no longer detected, or overridden.

From the above, it is to be appreciated that defined herein are person support apparatus and methods for performing a set by preview subroutine and a rotation preview subroutine such that a degree of actuation of an actuating device may be set by positioning the actuating device during the set by preview subroutine and storing the values of the position of the actuating device to be utilized during the rotation preview subroutine. This alleviates the need for identifying specific values such as, for example, inflation percentages, which may result in a different position for each person on the person support surface. Rather, this permits a position of the person support surface of the person support apparatus to be set based on an actual position of the person support surface independent of an inflation percentage.

Further aspects of the embodiments described herein are provided by the subject matter of the following clauses:

Clause 1. A person support apparatus comprising: a person support surface including an actuating device; and a controller operable to control the actuating device, the controller comprising a processor and a non-transitory memory device, the memory device including instructions that, when executed by the processor, cause the processor to operate the actuating device to perform a set by preview subroutine and a rotation preview subroutine, wherein, during the set by preview subroutine, the controller receives user input positioning the actuating device into a first preview position and sets the first preview position as a first evaluation position, wherein, during the set by preview subroutine, the controller receives user input positioning the actuating device into a second preview position and sets the second preview position as a second evaluation position, wherein, during the rotation preview subroutine, the controller causes the actuating device to move the person support surface to the first evaluation position for a first predetermined period of time, wherein the controller causes the actuating device to move the person support surface to a flat position for a second predetermined period of time after the first predetermined period of time, and wherein the controller causes the actuating device to move the person support surface to the second evaluation position for a third predetermined period of time after the second predetermined period of time.

Clause 2. The person support apparatus of clause 1, wherein, after the rotation preview subroutine, the controller causes the actuating device to move the person support surface to a desired angle of rotation over a rotation period of time that is greater than the first predetermined period of time.

Clause 3. The person support apparatus of clause 1 or clause 2, wherein: the actuating device includes a left rotation bladder and a right rotation bladder; and the first preview position includes at least one of a left rotation position, wherein the left rotation bladder is inflated to a capacity greater than the right rotation bladder, and a right rotation position, wherein the right rotation bladder is inflated to a capacity greater than the left rotation bladder.

Clause 4. The person support apparatus of claim 3, wherein the second preview position includes the other of the left rotation position and the right rotation position.

Clause 5. The person support apparatus of claim 4, further comprising a user interface generating one or more left rotation buttons for entering parameters for the left rotation position and one or more right rotation buttons for entering parameters of the right rotation position prior to the start of the preview subroutine.

Clause 6. The person support apparatus of claim 5, wherein: the one or more left rotation buttons includes a first left rotation button and a second left rotation button, operation of the first left rotation button results in incremental inflation of the left rotation bladder and operation of the second left rotation button results in incremental deflation of the left rotation bladder; and the one or more right rotation buttons includes a first right rotation button and a second right rotation button, operation of the first right rotation button results in incremental inflation of the right rotation bladder and operation of the second right rotation button results in incremental deflation of the right rotation bladder.

Clause 7. The person support apparatus of any one of clauses 3-7, wherein, in the flat position, the right rotation bladder and the left rotation bladder are inflated to substantially the same capacity.

Clause 8. The person support apparatus of any one of clauses 3-7, wherein the first preview position has an angle of rotation relative to a longitudinal axis of the person support surface that is within a range of 1 degree to 40 degrees.

Clause 9. The person support apparatus of any one of clauses 3-7, wherein the second preview position has an angle of rotation relative to a longitudinal axis of the person support surface that is within a range of 1 degree to 40 degrees.

Clause 10. A person support apparatus comprising: a person support surface including an actuating device; and a controller operable to control the actuating device, the controller comprising a processor and a non-transitory memory device, the memory device including instructions that, when executed by the processor, cause the processor to operate the actuating device to simultaneously perform a rotation subroutine and a percussion and vibration (P&V) subroutine, wherein, during the rotation subroutine, the controller causes the actuating device to move the person support surface to a first rotation position for a first predetermined period of time, wherein the actuating device causes the actuating device to move the person support surface to a flat position for a second predetermined period of time after the first predetermined period of time, wherein the actuating device causes the actuating device to move the person support surface to a second rotation position for a third predetermined period of time after the second predetermined period of time, and wherein, during the rotation subroutine, the controller causes the actuating device to perform P&V therapy.

Clause 11. The person support apparatus of clause 10, wherein: the actuating device includes a left rotation bladder and a right rotation bladder; and the first rotation position includes at least one of a left rotation position, wherein the left rotation bladder is inflated to a capacity greater than the right rotation bladder, and a right rotation position, wherein the right rotation bladder is inflated to a capacity greater than the left rotation bladder.

Clause 12. The person support apparatus of clause 11, wherein the second rotation position includes the other of the left rotation position and the right rotation position.

Clause 13. The person support apparatus of clause 11 or clause 12, wherein the actuating device includes at least one left P&V bladder and at least one right P&V bladder.

Clause 14. The person support apparatus of clause 13, further comprising a user interface generating one or more parameter buttons for entering parameters for the one or more left P&V bladders and the one or more right P&V bladders.

Clause 15. The person support apparatus of clause 14, wherein: the one or more parameter buttons includes a "Custom" parameter; and selection of the one or more parameter buttons permits independent selection of an intensity of percussion of the one or more left P&V bladders and the one or more right P&V bladders, and an intensity of the one or more left P&V bladders and the one or more right P&V bladders.

Clause 16. A method comprising: receiving user input including instructions to position a actuating device of a person support surface into a first preview position and setting the first preview position as a first evaluation position; receiving user input including instructions to position the actuating device into a second preview position and setting the second preview position as a second evaluation position; operating the actuating device to move the person support surface to the first evaluation position for a first predetermined period of time; operating the actuating device to move the person support surface to a flat position for a second predetermined period of time after the first predetermined period of time; and operating the actuating device to move the person support surface to the second evaluation position for a third predetermined period of time after the second predetermined period of time.

Clause 17. The method of clause 16, wherein, after the rotation preview subroutine, the actuating device moves the person support surface to a desired angle of rotation over a rotation period of time that is greater than the first predetermined period of time.

Clause 18. The method of clause 16 or clause 17, wherein: the actuating device includes a left rotation bladder and a right rotation bladder; and the first preview position includes at least one of a left rotation position, wherein the left rotation bladder is inflated to a capacity greater than the right rotation bladder, and a right rotation position, wherein the right rotation bladder is inflated to a capacity greater than the left rotation bladder.

Clause 19. The method of clause 18, wherein the second preview position includes the other of the left rotation position and the right rotation position.

Clause 20. The method of clause 19, further comprising generating one or more left rotation buttons for entering parameters for the left rotation position and one or more right rotation buttons for entering parameters of the right rotation position prior to a start of the preview subroutine.

Clause 21. The method of clause 20, wherein: the one or more left rotation buttons includes a first left rotation button and a second left rotation button; the one or more right rotation buttons includes a first right rotation button and a second right rotation button; incrementally inflating the left rotation bladder in response to operation of the first left rotation button; incrementally deflating the left rotation bladder in response to operation of the second left rotation button; incrementally inflating the right rotation bladder in response to operation of the first right rotation button; and incrementally deflating the right rotation bladder in response to operation of the second right rotation button.

Clause 22. The method of any one of clauses 18-21, wherein, in the flat position, the right rotation bladder and the left rotation bladder are inflated to substantially the same capacity.

Clause 23. The method of any one of clauses 18-22, wherein the first preview position has an angle of rotation relative to a longitudinal axis of the person support surface that is within a range of 1 degree to 40 degrees.

Clause 24. The method of any one of clauses 18-23, wherein the second preview position has an angle of rotation relative to a longitudinal axis of the person support surface that is within a range of 1 degree to 40 degrees.

It will be apparent to those skilled in the art that various modifications and variations can be made to the embodiments described herein without departing from the scope of the claimed subject matter. Thus, it is intended that the specification cover the modifications and variations of the various embodiments described herein provided such modification and variations come within the scope of the appended claims and their equivalents.

What is claimed is:

1. A person support apparatus comprising:

a person support surface including an actuating device; and a controller operable to control the actuating device, the controller comprising a processor and a non-transitory memory device, the memory device including instructions that, when executed by the processor, cause the processor to operate the actuating device to perform a set by preview subroutine and a rotation preview subroutine, wherein, during the set by preview subroutine, the controller receives user input positioning the actuating device into a first preview position and sets the first preview position as a first evaluation position, wherein, during the set by preview subroutine, the controller receives user input positioning the actuating device into a second preview position and sets the second preview position as a second evaluation position, wherein, during the rotation preview subroutine, the controller causes the actuating device to move the person support surface to the first evaluation position set during the set by preview subroutine for a first predetermined period of time, wherein the controller causes the actuating device to move the person support surface to a flat position for a second predetermined period of time after the first predetermined period of time, and wherein the controller causes the actuating device to move the person support surface to the second evaluation position set during the set by preview subroutine for a third predetermined period of time after the second predetermined period of time.

2. The person support apparatus of claim 1, wherein, after the rotation preview subroutine, the controller causes the actuating device to move the person support surface to a desired angle of rotation over a rotation period of time that is greater than the first predetermined period of time.

3. The person support apparatus of claim 1, wherein:

the actuating device includes a left rotation bladder and a right rotation bladder; and the first preview position is one of a left rotation position, wherein the left rotation bladder is inflated to a capacity greater than the right rotation bladder, and a right rotation position, wherein the right rotation bladder is inflated to a capacity greater than the left rotation bladder.

4. The person support apparatus of claim 3, wherein the second preview position is the other of the left rotation position and the right rotation position.

5. The person support apparatus of claim 4, further comprising a user interface generating one or more left rotation buttons for entering parameters for the left rotation position and one or more right rotation buttons for entering parameters of the right rotation position prior to the start of the preview subroutine.

6. The person support apparatus of claim 5, wherein:

the one or more left rotation buttons includes a first left rotation button and a second left rotation button, operation of the first left rotation button results in incremental inflation of the left rotation bladder and operation of the second left rotation button results in incremental deflation of the left rotation bladder; and the one or more right rotation buttons includes a first right rotation button and a second right rotation button, operation of the first right rotation button results in incremental inflation of the right rotation bladder and operation of the second right rotation button results in incremental deflation of the right rotation bladder.

7. The person support apparatus of claim 3, wherein, in the flat position, the right rotation bladder and the left rotation bladder are inflated to substantially the same capacity.

8. The person support apparatus of claim 3, wherein the first preview position has an angle of rotation relative to a longitudinal axis of the person support surface that is within a range of 1 degree to 40 degrees.

9. The person support apparatus of claim 3, wherein the second preview position has an angle of rotation relative to a longitudinal axis of the person support surface that is within a range of 1 degree to 40 degrees.

10. A person support apparatus comprising:

a person support surface including an actuating device; and a controller operable to control the actuating device, the controller comprising a processor and a non-transitory memory device, the memory device including instructions that, when executed by the processor, cause the processor to operate the actuating device to simultaneously perform a rotation subroutine and a percussion and vibration (P&V) subroutine, wherein, during the rotation subroutine, the controller causes the actuating device to move the person support surface to a first rotation position for a first predetermined period of time, wherein the actuating device causes the actuating device to move the person support surface to a flat position for a second predetermined period of time after the first predetermined period of time, wherein the actuating device causes the actuating device to move the person support surface to a second rotation position for a third predetermined period of time after the second predetermined period of time, wherein, during the rotation subroutine, the controller causes the actuating device to perform P&V therapy, and wherein, during the rotation subroutine, the controller causes the actuating device to halt operation in response to detecting a fault condition, the fault condition including an incline position of a portion of the person support surface exceeding a predetermined threshold.

11. The person support apparatus of claim 10, wherein:

the actuating device includes a left rotation bladder and a right rotation bladder; and the first rotation position is one of a left rotation position, wherein the left rotation bladder is inflated to a capacity greater than the right rotation bladder, and a right rotation position, wherein the right rotation bladder is inflated to a capacity greater than the left rotation bladder.

12. The person support apparatus of claim 11, wherein the second rotation position is the other of the left rotation position and the right rotation position.

13. The person support apparatus of claim 11, wherein the actuating device includes at least one left P&V bladder and at least one right P&V bladder.

14. The person support apparatus of claim 13, further comprising a user interface generating one or more parameter buttons for entering parameters for the one or more left P&V bladders and the one or more right P&V bladders.

15. The person support apparatus of claim 14, wherein:

the one or more parameter buttons includes a "Custom" parameter; and selection of the one or more parameter buttons permits independent selection of an intensity of percussion of the one or more left P&V bladders and the one or more right P&V bladders, and an intensity of the one or more left P&V bladders and the one or more right P&V bladders.

16. A method comprising:

receiving user input including instructions to position an actuating device of a person support surface into a first preview position and setting the first preview position as a first evaluation position;

receiving user input including instructions to position the actuating device into a second preview position and setting the second preview position as a second evaluation position;

operating the actuating device to move the person support surface to the first evaluation position for a first predetermined period of time;

operating the actuating device to move the person support surface to a flat position for a second predetermined period of time after the first predetermined period of time; and operating the actuating device to move the person support surface to the second evaluation position for a third predetermined period of time after the second predetermined period of time.

17. The method of claim 16, wherein, after the rotation preview subroutine, the actuating device moves the person support surface to a desired angle of rotation over a rotation period of time that is greater than the first predetermined period of time.

18. The method of claim 16, wherein:

the actuating device includes a left rotation bladder and a right rotation bladder; and the first preview position is one of a left rotation position, wherein the left rotation bladder is inflated to a capacity greater than the right rotation bladder, and a right rotation position, wherein the right rotation bladder is inflated to a capacity greater than the left rotation bladder.

19. The method of claim 18, wherein the second preview position is the other of the left rotation position and the right rotation position.

20. The method of claim 19, further comprising generating one or more left rotation buttons for entering parameters for the left rotation position and one or more right rotation buttons for entering parameters of the right rotation position prior to a start of the preview subroutine.

21. The method of claim 20, wherein:

the one or more left rotation buttons includes a first left rotation button and a second left rotation button;

the one or more right rotation buttons includes a first right rotation button and a second right rotation button;

incrementally inflating the left rotation bladder in response to operation of the first left rotation button;

incrementally deflating the left rotation bladder in response to operation of the second left rotation button;

incrementally inflating the right rotation bladder in response to operation of the first right rotation button; and incrementally deflating the right rotation bladder in response to operation of the second right rotation button.

22. The method of claim 18, wherein, in the flat position, the right rotation bladder and the left rotation bladder are inflated to substantially the same capacity.

23. The method of claim 18, wherein the first preview position has an angle of rotation relative to a longitudinal axis of the person support surface that is within a range of 1 degree to 40 degrees.

24. The method of claim 18, wherein the second preview position has an angle of rotation relative to a longitudinal axis of the person support surface that is within a range of 1 degree to 40 degrees.

* * * * *